(12) United States Patent
Romaine et al.

(10) Patent No.: US 11,062,243 B2
(45) Date of Patent: Jul. 13, 2021

(54) ACTIVITY INTEGRATION ASSOCIATED WITH RESOURCE SHARING MANAGEMENT APPLICATION

(71) Applicant: BANK OF AMERICA CORPORATION, Charlotte, NC (US)

(72) Inventors: Gary Keith Romaine, Charlotte, NC (US); Christine Denise Howe, Brooksville, ME (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 331 days.

(21) Appl. No.: 15/862,991

(22) Filed: Jan. 5, 2018

(65) Prior Publication Data
US 2019/0034849 A1  Jan. 31, 2019

Related U.S. Application Data

(60) Provisional application No. 62/536,804, filed on Jul. 25, 2017.

(51) Int. Cl.
| | |
|---|---|
| *G06Q 10/06* | (2012.01) |
| *G06F 3/0484* | (2013.01) |
| *G06F 3/01* | (2006.01) |
| *H04L 12/24* | (2006.01) |
| *H04L 12/911* | (2013.01) |
| *H04L 29/08* | (2006.01) |

(52) U.S. Cl.
CPC ....... *G06Q 10/06312* (2013.01); *G06F 3/017* (2013.01); *G06F 3/04842* (2013.01); *H04L 41/00* (2013.01); *H04L 47/70* (2013.01); *H04L 67/10* (2013.01); *H04L 67/141* (2013.01)

(58) Field of Classification Search
CPC ....... H04L 47/70; H04L 67/306; H04L 67/26; H04L 67/10; H04L 67/16; G06F 16/954; G06F 9/50; G06F 9/5083; G06Q 10/06; G06Q 10/10
See application file for complete search history.

(56) References Cited

U.S. PATENT DOCUMENTS

| | | | |
|---|---|---|---|
| 5,933,810 | A | 8/1999 | Okawa |
| 6,134,534 | A | 10/2000 | Walker et al. |
| 6,839,720 | B1 | 1/2005 | Thibodeau |
| 6,950,874 | B2 | 9/2005 | Chang et al. |

(Continued)

*Primary Examiner* — Jerry O'Connor
*Assistant Examiner* — Michael R Koester
(74) *Attorney, Agent, or Firm* — Michael A. Springs; Moore & Van Allen PLLC; Vaidehi Bachot

(57) ABSTRACT

Embodiments of the invention are directed to systems, methods, and computer program products for providing an enhanced resource sharing management platform configured for intelligent, proactive and responsive integration of resource activity functionality with a resource sharing management application provided on a user device. The system is further configured to perform one or more user activities, in an integrated manner, within a single interface of the user device, without requiring the user to operate disparate applications. Furthermore, the system is configured to receive user input through multiple communication channels such as a textual communication channel and an audio communication channel. The system is further configured to switch between the various communication channels seamlessly, and in real-time.

20 Claims, 6 Drawing Sheets

(56) References Cited

U.S. PATENT DOCUMENTS

| | | | |
|---|---|---|---|
| 7,636,669 B1 | 12/2009 | Bergert | |
| 8,065,175 B1 | 11/2011 | Lewis | |
| 8,121,953 B1 | 2/2012 | Orttung et al. | |
| 9,092,813 B2 | 7/2015 | Pappas et al. | |
| 9,852,487 B1* | 12/2017 | Farnsworth | G06Q 30/0617 |
| 2002/0026337 A1 | 2/2002 | Sasaki | |
| 2002/0133382 A1 | 9/2002 | DeMarcken et al. | |
| 2002/0169682 A1 | 11/2002 | Capek et al. | |
| 2006/0190279 A1 | 8/2006 | Heflin | |
| 2007/0156429 A1* | 7/2007 | Godar | G06Q 10/06 |
| | | | 705/5 |
| 2007/0260495 A1 | 11/2007 | Mace et al. | |
| 2008/0065429 A1 | 3/2008 | Galloway | |
| 2008/0215384 A1 | 9/2008 | Mulholland et al. | |
| 2009/0006184 A1 | 1/2009 | Leach et al. | |
| 2009/0083137 A1 | 3/2009 | Tsai et al. | |
| 2011/0015954 A1 | 1/2011 | Ward | |
| 2013/0041902 A1 | 2/2013 | Swann et al. | |
| 2013/0197789 A1 | 8/2013 | Bhadkaria et al. | |
| 2013/0275252 A1 | 10/2013 | Martin et al. | |
| 2014/0081678 A1 | 3/2014 | Reynolds | |
| 2015/0199754 A1* | 7/2015 | Greystoke | G06Q 50/16 |
| | | | 705/307 |
| 2015/0235292 A1 | 8/2015 | Yerubandi et al. | |
| 2017/0116691 A1* | 4/2017 | Syiau | G06Q 30/0645 |
| 2017/0228682 A1* | 8/2017 | Nilsson | G16H 40/20 |

\* cited by examiner

ACTIVITY INTEGRATION ASSOCIATED WITH RESOURCE SHARING MANAGEMENT APPLICATION

CROSS-REFERENCE TO PRIORITY APPLICATION

This application claims priority to and the benefit of U.S. Provisional Patent Application Ser. No. 62/536,804 entitled "Activity Integration associated with Resource Sharing Management Application" filed on Jul. 25, 2017, which is hereby incorporated by reference in its entirety.

FIELD OF THE INVENTION

The present invention is directed to, in general, a network communication platform comprising a plurality of resource nodes having a resource sharing management platform for sharing and/or interchange of resources between the nodes. Furthermore, the present invention is configured to integrate resource activity technology and functionality into a resource sharing management application of a user device, proactively and in real-time.

BACKGROUND

Existing systems may comprise resource nodes with resource availability. There is a need for a system structured for resource sharing management amongst the resource nodes. Furthermore, execution of the resource sharing activities may require performance of associated resource activities. However, a user is required to access various applications and/or systems to perform the resource sharing and associated resource activities, which may be extremely time consuming, cumbersome and unwieldy. There is a need for an intelligent, proactive and responsive system that facilitates resource sharing amongst resource nodes along with execution of resource activities in an integrated manner.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an enhanced resource sharing management platform configured for intelligent, proactive and responsive integration of resource activity functionality with a resource sharing management application provided on a user device. The system is further configured to perform one or more user activities, in an integrated manner, within a single interface of the user device, without requiring the user to operate disparate applications. Furthermore, the system is configured to receive user input through multiple communication channels such as a textual communication channel and an audio communication channel. The system is further configured to switch between the various communication channels seamlessly, and in real-time.

Embodiments of the invention relate to systems, methods, and computer program products for establishing intelligent, proactive and responsive communication with a user, comprising an enhanced resource sharing management platform with integrated resource activity features for performing resource activities in an integrated manner from a single interface, the invention comprising: at least one memory device with computer-readable program code stored thereon; at least one communication device; and at least one processing device operatively coupled to the at least one memory device and the at least one communication device. Typically, executing the computer-readable code is configured to cause the at least one processing device to: initiate presentation of a user interface associated with a resource sharing management application on a first user device associated with the first user, wherein the resource sharing management application is configured to present the user interface on a display device of the first user device; identify at least one resource associated with a resource availability at a predetermined time period, based on at least a user input received via the resource sharing management application; identify an auxiliary user associated with the at least one resource; establish an operative communication channel between a first resource node associated with the first user and an auxiliary resource node associated with the auxiliary user; initiate presentation of a shared resource interface across a distributed network of nodes such that a real-time view of the shared resource interface is presented on each node of the distributed network of nodes for a predetermined time interval, wherein the distributed network nodes comprises the first resource node and the auxiliary resource node, wherein the shared resource interface is structured to (i) allow a real-time virtual resource exploration of the at least one resource by each of the distributed network of nodes and (ii) provide real-time communication between each of the distributed network of nodes via the shared resource interface; receive, via the shared resource interface presented on the first resource node, a selection of the at least one resource; identify historical resource parameters associated with the at least one resource; determine a resource provisioning activity associated with the at least one resource based on at least the historical resource parameters, wherein the resource provisioning activity is associated with a predetermined geographical area associated with the at least one resource; identify an added resource associated with the resource provisioning activity, wherein the added resource is associated with the predetermined geographical area and the predetermined time period; present, via the resource sharing management application, the resource provisioning activity and the identified added resource to the first user on the display device of the first user device; initiate provisioning of the at least one resource based on receiving a first confirmation from the first user; and initiate execution of the determined resource provisioning activity using the added resource within the predetermined geographical area based on receiving a second confirmation from the first user.

In one embodiment, or in combination with the previous embodiment, establishing an operative communication channel between the first resource node associated with the first user and the auxiliary resource node associated with the auxiliary user further comprises: receiving, via the resource sharing management application, an indication from the first user to initiate the presentation of the shared resource interface across the distributed network of nodes; identifying a plurality of resource nodes associated with the first user; and determining the first resource node of the plurality of resource nodes based on at least (i) determining that the first resource node comprises a visual display device, (ii) determining that the first resource node is within a predetermined proximity of a location of the first user, and (iii) determining that the first user is currently active on the first resource node.

In one embodiment, or in combination with any of the previous embodiments, the plurality of resource nodes associated with the first user comprise an Augmented Reality (AR) headset, a smart wearable device, a smart television device, a mobile device, a computing device and the first user device.

In one embodiment, or in combination with any of the previous embodiments, establishing the operative communication channel between the first resource node associated with the first user and the auxiliary resource node associated with the auxiliary user further comprises: receiving, via the resource sharing management application, a virtual session indication from the first user to initiate the presentation of the shared resource interface across the distributed network of nodes, wherein the virtual session indication comprises a selection of the auxiliary user; identifying a plurality of resource nodes associated with the auxiliary user; determining the auxiliary resource node of the plurality of resource nodes based on at least (i) determining that the auxiliary resource node comprises a visual display device, (ii) determining that the auxiliary resource node is within a predetermined proximity of a location of the auxiliary user, and (iii) determining that the auxiliary user is currently active on the first resource node; transmitting a trigger signal to the auxiliary resource node, wherein the trigger signal is structured to cause the auxiliary resource node to present, in real-time, the shared resource interface; and transmitting, a notification to an active resource node of the plurality of resource nodes indicating the presentation of the shared resource interface on the auxiliary resource node.

In one embodiment, or in combination with any of the previous embodiments, (a) the user input, received via the resource sharing management application, comprises an indication for provisioning the at least one resource for a user group comprising the first user and the auxiliary user, and (b) the plurality of resource nodes associated with the auxiliary user comprise an AR headset, a smart wearable device, a smart television device, a mobile device and a computing device.

In one embodiment, or in combination with any of the previous embodiments, the auxiliary user is associated with providing the at least one resource for provisioning, wherein the plurality of resource nodes associated with the auxiliary user comprise a visual capture device.

In one embodiment, or in combination with the previous embodiment, the shared resource interface comprises a real-time virtual resource exploration component. Here, the invention is further configured to: present, the real-time virtual resource exploration component comprising an interactive audio-visual stream associated with the at least one resource on each of the distributed network of nodes; identify a predetermined gesture performed by the first user on the first resource node; transmit a first trigger signal to the first resource node, the first trigger signal being structured to cause the first resource node to present, in real-time, a first graphical communication overlay element over a display of the interactive audio-visual stream of the shared resource interface presented on the first resource node, wherein the first graphical communication overlay element is associated with the predetermined gesture performed by the first user; and transmit a second trigger signal to the auxiliary resource node, the second trigger signal being structured to cause the auxiliary resource node to present, in real-time, a second graphical communication overlay element over a display of the interactive audio-visual stream of the shared resource interface presented on the auxiliary resource node, wherein the second graphical communication overlay element is associated with the predetermined gesture performed by the first user.

In one embodiment, or in combination with the previous embodiment, the audio-visual stream associated with the at least one resource is captured, in real-time, via a visual capture device associated with the at least one resource.

In one embodiment, or in combination with any of the previous embodiments, the at least one resource comprises a dwelling having the resource availability at the predetermined time period. Moreover, initiating provisioning of the at least one resource based on receiving a user confirmation further comprises: transmitting a control signal to a resource provider node, the control signal being configured to reserve the dwelling for the predetermined time period, wherein the resource provider node is associated with the at least one resource.

In one embodiment, or in combination with any of the previous embodiments, identifying the historical resource parameters associated with the at least one resource further comprises: identifying resource attributes associated with the at least one resource; identifying user attributes associated with the first user; and based on at least the resource attributes and the user attributes, parsing historical data stored at a data storage device to produce the historical resource parameters, wherein the historical resource parameters comprise historical activity data associated with a plurality of individuals such that at least (i) the historical activity data matches the resource attributes and (ii) the plurality of individuals match the user attributes.

In one embodiment, or in combination with any of the previous embodiments, (a) the user input, received via the resource sharing management application, comprises an indication for provisioning the at least one resource for a user group comprising the first user and the auxiliary user, and (b) determining the resource provisioning activity associated with the at least one resource further comprises: parsing the historical resource parameters comprising historical activity data associated with a plurality of individuals to determine the resource provisioning activity, based on at least one of (i) determining that an individual group of the plurality of individuals associated with the resource provisioning activity corresponds to the user group, (ii) determining that a date associated with the resource provisioning activity corresponds to the predetermined time period, and (iii) determining that the resource provisioning activity corresponds to anticipated activities of the first user.

In one embodiment, or in combination with any of the previous embodiments, the historical resource parameters comprise historical activity data associated with a plurality of individuals. Here, identifying the added resource associated with the resource provisioning activity further comprises: identifying a plurality of entities associated with performing the resource provisioning activity in the predetermined geographical area associated with the at least one resource; determining a first entity of the plurality of entities based on at least one of (i) determining that a location of first entity in within a first predetermined distance from a geographical location of the at least one resource, (ii) determining that the location of first entity in within a second predetermined distance from a geographical location of an itinerary of the first user associated with the predetermined time period, and (iii) determining that the first entity matches an entity associated with the historical activity data associated with the plurality of individuals; and identifying, based on receiving a signal from an entity system associated with the first entity, added resource associated with the resource provisioning activity provided by the first entity that are associated with the predetermined geographical area and the predetermined time period.

In one embodiment, or in combination with any of the previous embodiments, initiating execution of the resource provisioning activity using the added resource further comprises: receiving an activity trigger signal comprising an indication of initiation of the resource provisioning activity at a first entity by the first user; and transmitting, to an entity system associated with the first entity, a control signal structured to cause the first entity to supplement a resource transfer value associated with performing the resource provisioning activity at the first entity with the added resource.

In one embodiment, or in combination with any of the previous embodiments, the invention is further configured to transmit the resource sharing management application to the first user device associated with the first user, wherein the resource sharing management application is structured to: access a credential instrument application stored on the first user device; cause a presentation of a portion of a credential instrument application interface within the user interface of the resource sharing management application; and receive a selection of a user credential instrument from the first user, via the portion of the credential instrument application presented within the user interface of the resource sharing management application; and wherein initiating provisioning of the at least one resource further comprises initiating a resource transfer from the selected user credential instrument to a resource provider credential instrument associated with the at least one resource.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
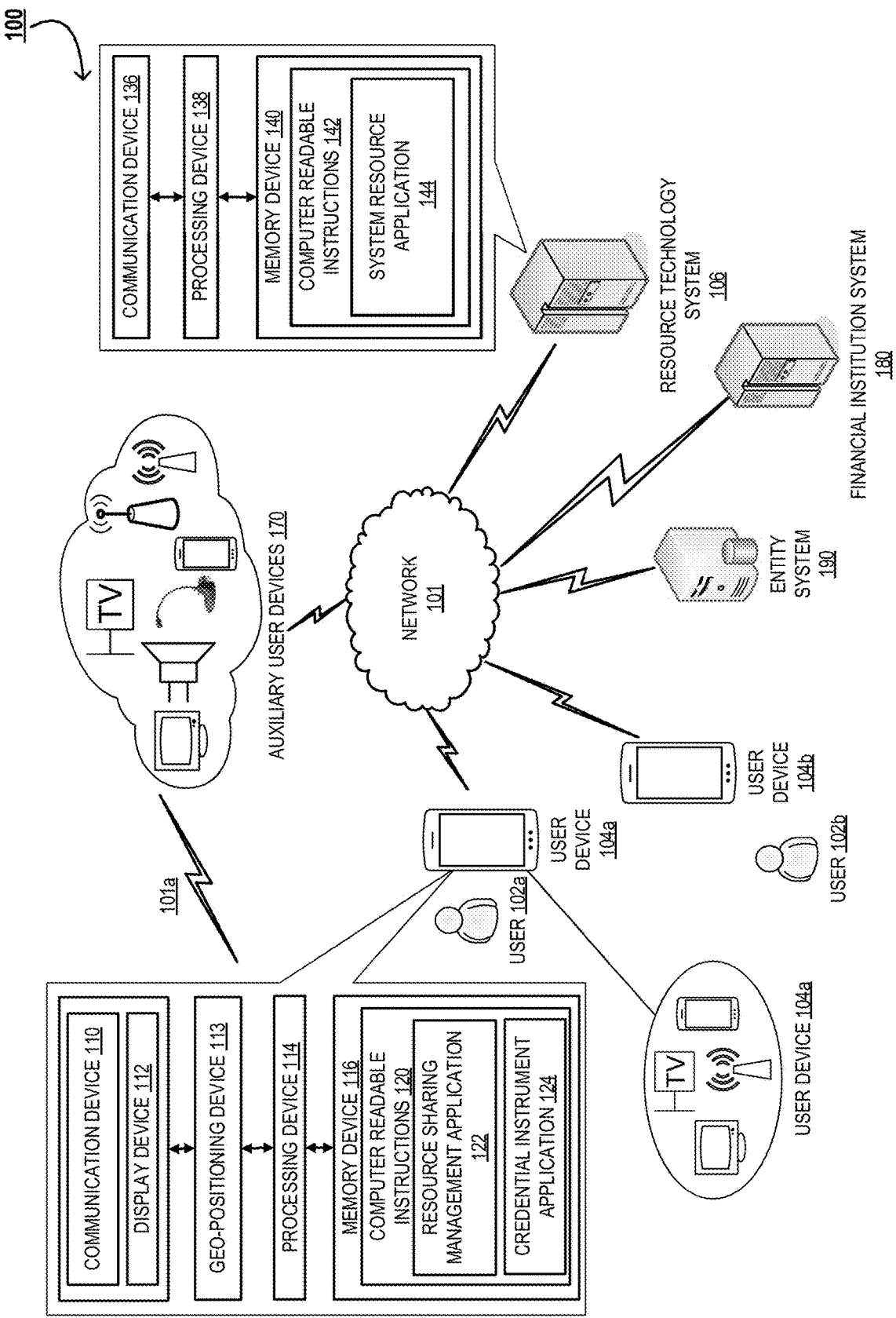
Figure 2:
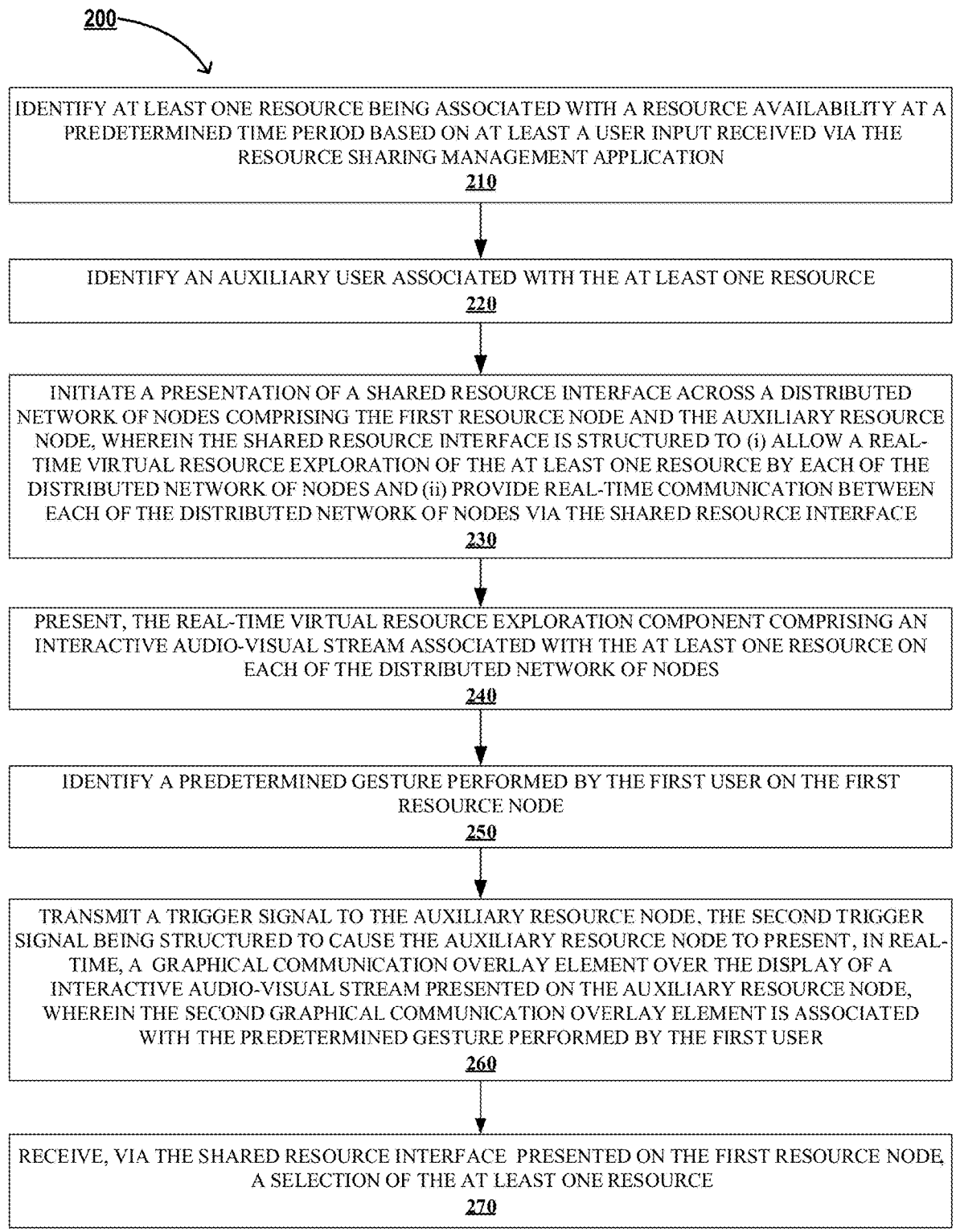
Figure 3:
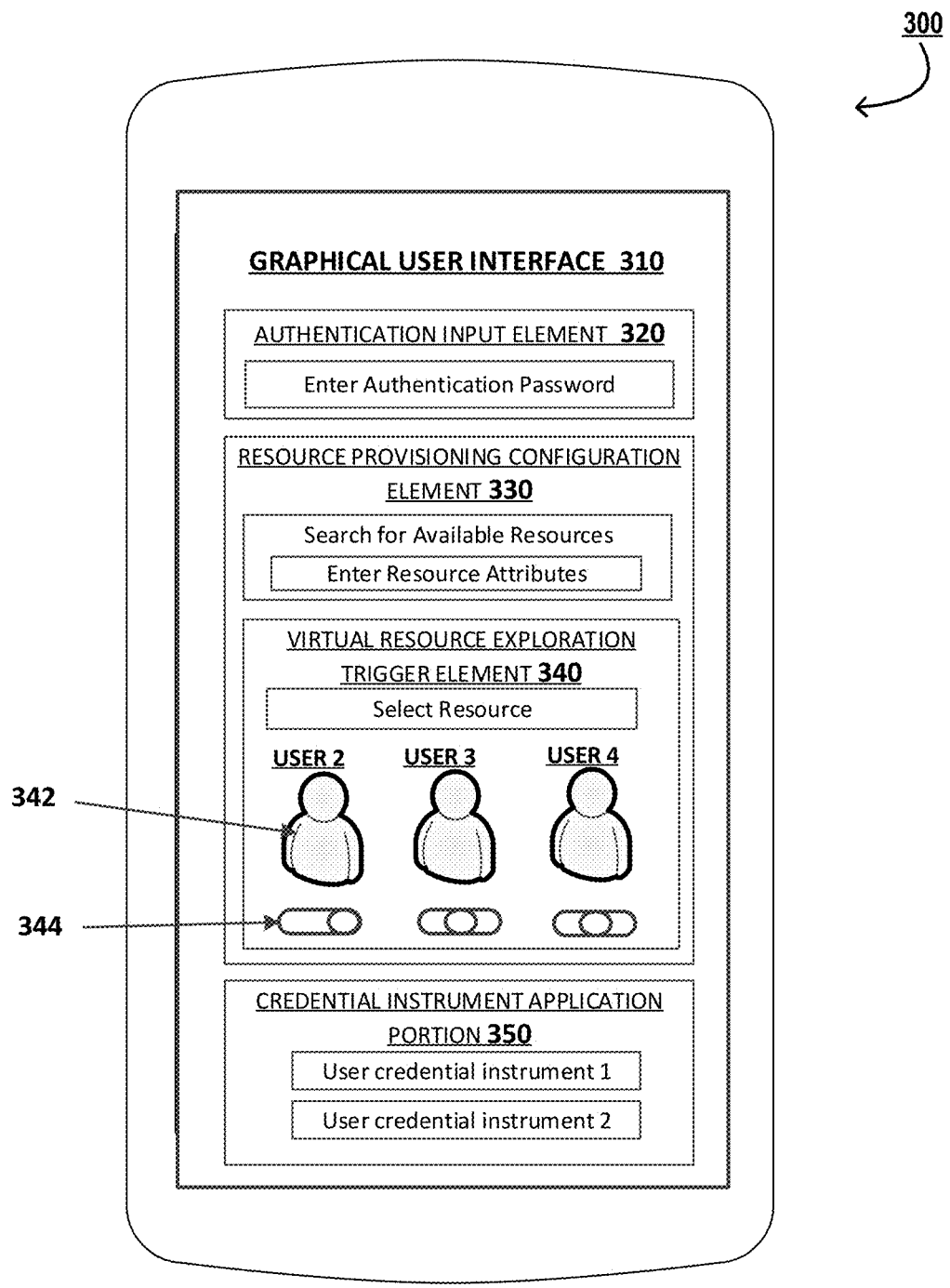
Figure 4:
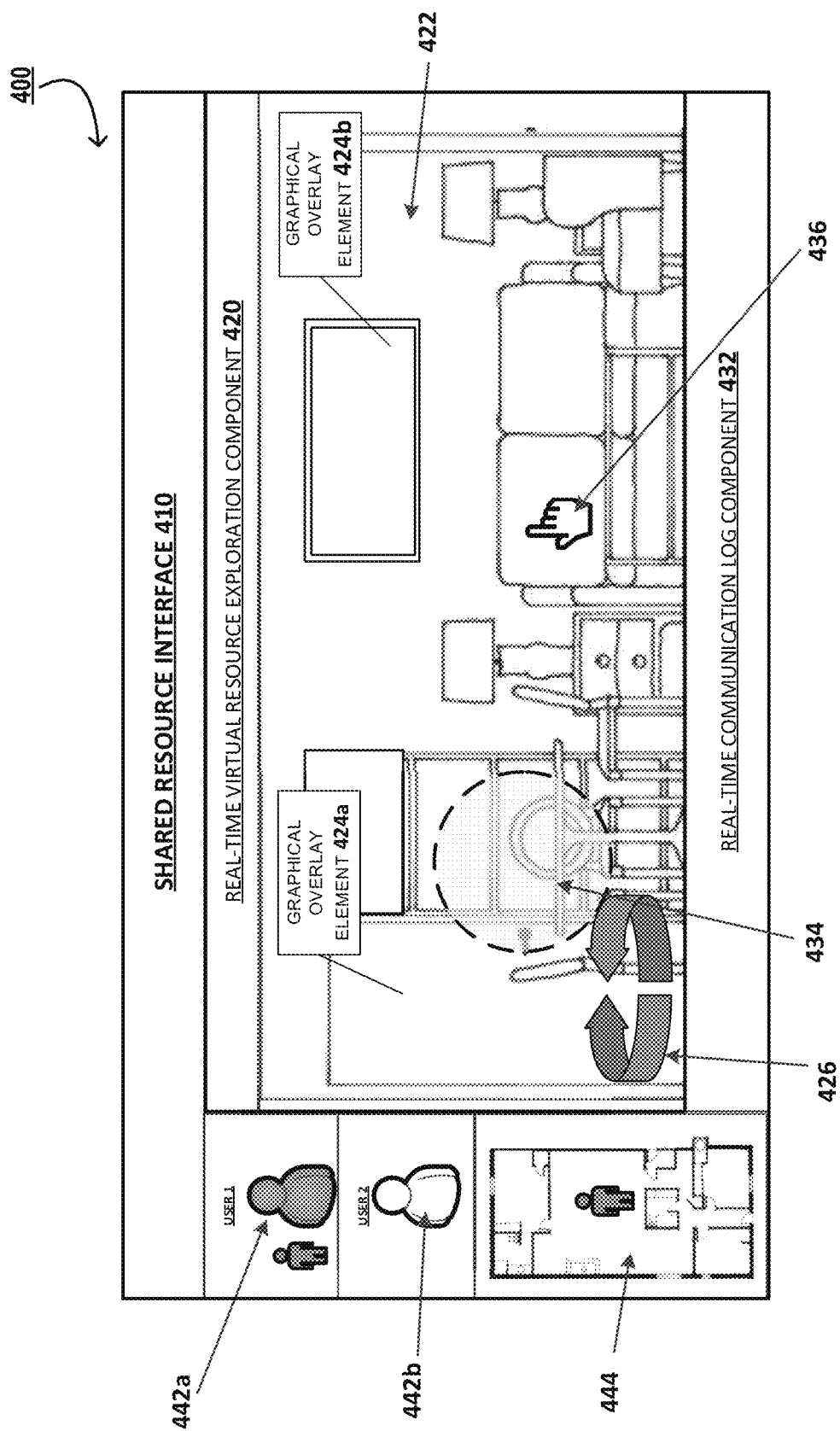
Figure 5:
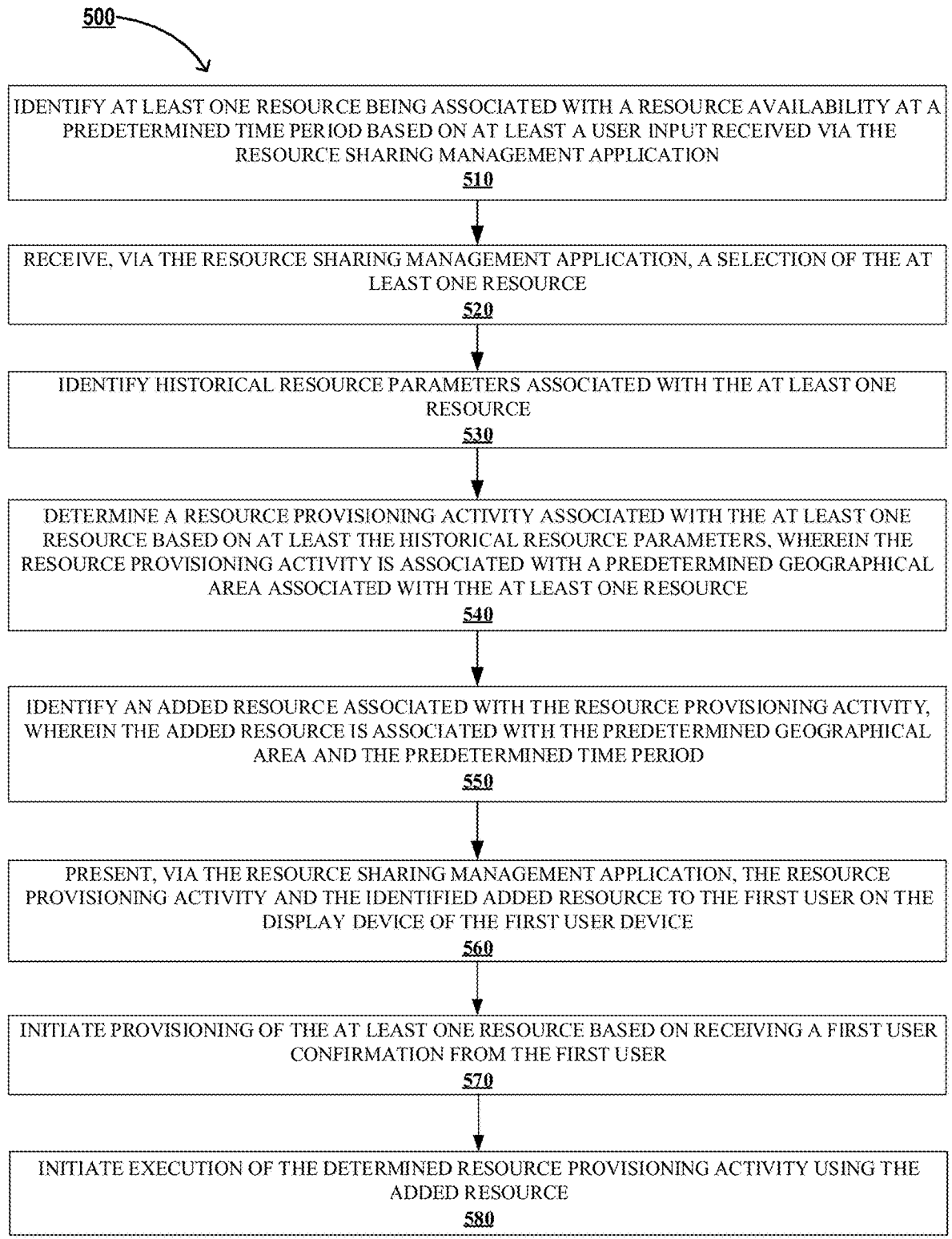
Figure 6:
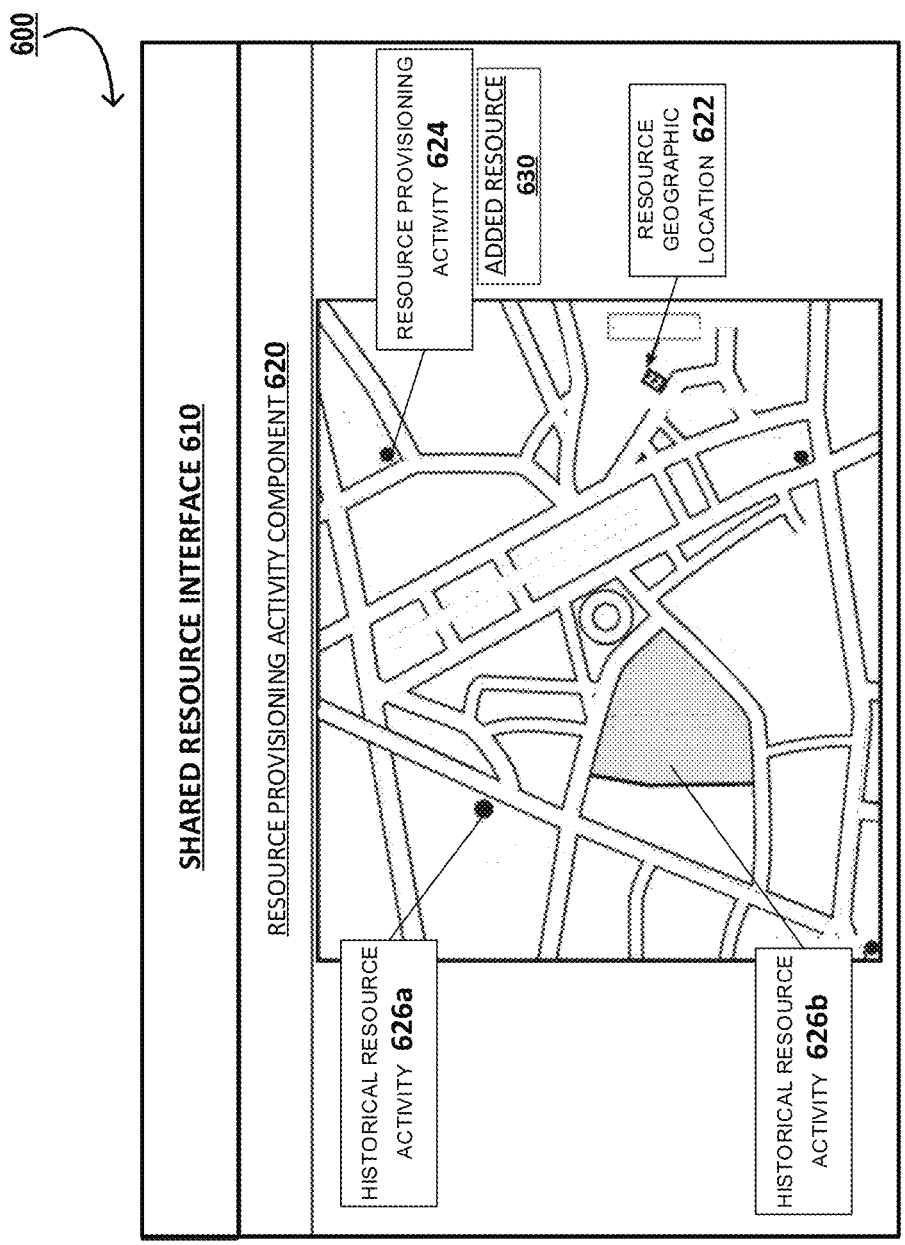

Having thus described embodiments of the invention in general terms, reference will now be made to the accompanying drawings, wherein:

FIG. 1 depicts an enhanced resource sharing management platform environment 100, in accordance with one embodiment of the present invention;

FIG. 2 illustrates a high level process flow 200 directed to activity integration associated with a resource sharing management application, in accordance with one embodiment of the present invention;

FIG. 3 illustrates a graphical user interface 300 associated with a resource sharing management application, in accordance with one embodiment of the present invention;

FIG. 4 illustrates a graphical user interface 400 associated with a resource sharing management application, in accordance with one embodiment of the present invention;

FIG. 5 illustrates a high level process flow 500 directed to activity integration associated with a resource sharing management application, in accordance with one embodiment of the present invention; and FIG. 6 illustrates a graphical user interface 600 associated with a resource sharing management application, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, resource sharing systems and the like. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity and/or a financial institution. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In some embodiments, "resources" or "resource" or "at least one resource" as used herein may refer to products, services, possessions, merchandise, properties, goods and the like associated with an individual or resource provider or resource provider user, having resource availability or surplus, for example, availability of a predetermined resource quantity (e.g., time) (e.g., during a predetermined time period). In some embodiments, a first resource is dwelling (e.g., apartment, house, room, etc.) or accommodation (e.g., dwelling having predetermined utilities/services such as two apartment rooms having an associated kitchenette, groceries, parking, etc.) available for rent/reservation/provisioning for a time period A, and during an interval of month B- month C in a location L (e.g., geographic location of the dwelling). The first resource maybe offered by an individual or resource provider or resource provider user for rent/reservation/provisioning. The individual an individual or resource provider or resource provider user maybe associated with electronic user devices (e.g., visual capture devices, smartphones, personal digital assistants, computing devices, smart televisions, and the like) that are referred to as "resource nodes". In some instances, in this regard, the "resource node" may be a user device associated with the user or resource provider configured for communicating with the networked system herein for transmitting resource availability, receiving communication from other nodes, facilitating modification of resource availability, facilitating resource transfers, and the like.

These "resources" may be reserved, rented or otherwise provisioned by users (e.g., a first user), via an application stored on a user device associated with the users. In some embodiments, "resource nodes" as used herein may refer to user devices associated with the user having a resource deficiency and requiring a predetermined resource quantity, i.e., seeking to provision available resources. For example, a resource node maybe an electronic device associated with a first user requiring accommodation in location L for a time period within the time period A. In some instances, in this regard, the resource node may be a user device associated with the first user configured for communicating with the networked system herein for transmitting resource requirement, receiving communication from other nodes, facilitating modification of resource availability, facilitating resource transfers, facilitating virtual resource exploration, and the like.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "credential instrument," "technology resource" or "account" may be the relationship that the user has with the entity (e.g., a financial institution, or the entity facilitating resource allocation/provisioning). Examples of credential instruments include a deposit account, such as a transactional account (e.g. a banking account), a savings account, an investment account, a money market account, a time deposit, a demand deposit, a pre-paid account, a credit account, or the like. The credential instrument or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more credential instruments or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface. Typically, a graphical user interface (GUI) is a type of interface that allows users to interact with graphical elements such as graphical icons and visual indicators such as secondary notation (e.g., via a screen, via pointer devices, via gestures, via spatial sensing, etc.), as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, auxiliary user devices, processing systems and the like. The graphical user interface may also be configured to be presented on one or more display devices associated with user devices that are configured for providing real or virtual interactive projections of the interface.

A resource activity, also referred to as a technology activity, such as a "resource transfer" or "transaction" or "resource provisioning activity", may refer to any electronic activities or communication between a user or entity and the financial institution, between the user and the entity, activities or communication between multiple entities, communication between resource nodes, between users, between technology applications and the like. A resource transfer (e.g., having a resource transfer value or amount) may refer to a payment, processing of funds, purchase of goods or services, a return of goods or services, a payment transaction, a credit transaction, or other interactions involving a user's resource or account. In some instances, a resource transfer refers to earmarking a predetermined quantity of available resources at a first surplus resource node based on communication with a second deficient resource node. In the context of a financial institution or a resource entity such as a merchant, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" refers to any activity initiated between a user and a resource entity such as a merchant, between the user and the financial instruction, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a customer or the like, who utilizes an external apparatus such as a user device, for resource allocation and provisioning, executing resource transfers or transactions, conducting interactive virtual exploration of resources, and the like. The external apparatus may be a user device or resource node (computing devices, mobile devices, wearable smart devices, augmented reality (AR) headset devices, smart phone devices, smart television devices, and the like), a payment instrument (credit cards, debit cards, checks, digital wallets, currency, loyalty points), and/or payment credentials (account numbers, payment instrument identifiers). In some embodiments, the user may perform transactions by swiping payment instruments at a transaction terminal, for example, by swiping a magnetic strip of a credit card along a magnetic reader of a transaction terminal. In some embodiments, the transactions may be performed by wireless communication or "tapping" between the customer device and a transaction terminal. In accordance with some embodiments of the invention, the term "tap" or "tapping" may refer to bringing an external apparatus close to or within a predetermined proximity of the activity interface device or transaction terminal interface, or auxiliary user devices, so that information (such as encrypted tokens, financial resource/account identifiers, and the like) can be communicated wirelessly between the external apparatus and the devices using short range wireless transmission technology, such near-field communication (NFC) technology, radio-frequency (RF) technology, audio-frequency communication, or the like. Tapping may include physically tapping the user device against an appropriate portion of the auxiliary user device or the transaction terminal or it may include only waving or holding the user device near an appropriate portion of the auxiliary user device or the transaction terminal without making physical contact with the transaction terminal.

In accordance with embodiments of the invention, the term "credential instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

FIG. 1 illustrates enhanced resource sharing management platform environment 100 with integrated resource activity features, in accordance with one embodiment of the present invention. As illustrated in FIG. 1, a resource technology system 106, configured for providing an intelligent, proactive and responsive application or system at one or more user devices (104*a*, 104*b*) (i.e., resource nodes), that facilitates execution of electronic resource activities in an integrated manner. In some embodiments, the resource technology system 106 is configured for providing an intelligent, proactive and responsive application or system at one or more user devices (104*a*, 104*b*) (e.g., resource nodes) for facilitating integrated resource allocation and sharing of resources such as dwellings and/or resources/utilities/services associated with the dwellings.

The resource technology system (referred to as "the system" or "the system 106") is operatively coupled, via a network 101 to one or more user devices 104 (comprising user devices 104*a*, 104*b*, associated with users 102*a* and 104*a* respectively), auxiliary user devices 170, to financial institution systems 180, entity systems 190 (e.g., merchant systems, entity/merchant databases etc.), and other external systems/third-party servers not illustrated herein. In this way, the resource technology system 106 can send information to and receive information from multiple user devices 104 (104*a*, 104*b*) to provide an integrated platform with multi-channel cognitive resource capabilities to a user 102 (102*a*, 102*b*), and particularly to the user device 104 (104*a*, 104*b*). As referred to herein, user device 104 may refer to the user device 104*a* and/or user device 104*b*, while user 102 may refer to the user 102*a* (e.g., a first user) and/or user 102*b* (e.g., an auxiliary user, resource provider user, etc.). Moreover, the user device 104*a* and/or user device 104*b* as described herein may be substantially similar in structure and/or function.

At least a portion of the enhanced resource sharing management platform with integrated resource activity features is typically configured to reside on the user device 104 (for example, at the resource sharing management application 122), on the system 106 (for example, at the system resource application 144), and/or on other devices and system and is an intelligent, proactive, responsive system that facilitates execution of electronic resource provisioning activities in an integrated manner. Furthermore, the enhanced resource sharing management platform is capable of seamlessly integrating user-specific and/or resource specific resource activity functionality into an interface of the resource sharing management application 122 and is typically infinitely customizable by the system 106 and/or the user 102.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the auxiliary user devices 170, (for example, based on reeving a user input, or when the user device 104 is within a predetermined proximity or broadcast range of the auxiliary devices 170), as illustrated by communication channel 101a. Therefore, the system, via the network 101 may establish, operative connections between otherwise incompatible devices, for example by establishing a communication channel 101a between the one or more user devices 104 and the auxiliary user devices 170. In this regard, the network 101 (and particularly the communication channels 101a) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 or it may include only waving or holding the external apparatus near an appropriate portion of the auxiliary user device without making physical contact with the auxiliary user device.

In some embodiments, the user 102 is an individual that wishes to conduct one or more activities associated with other resource nodes, with resource entities, etc., for example using the user device 104 (or an associated user node). In some embodiments, the user 102 may access the resource technology system 106, the resource entity system 160, and/or the financial institution system 180 through a user interface comprising a webpage or a user application. Hereinafter, "user application" is used to refer to an application (e.g., application 122, credential instrument application 124, etc.) on the user device 104 of the user 102, a widget, a webpage accessed through a browser, and the like. In some embodiments the user application is a resource sharing management application 122, referred to as a user application 122 herein, stored on the user device 104. In some embodiments the user application 122 may refer to a third party application or another user application stored on a cloud used to access the resource technology system 106 and/or the auxiliary user device 170 through the network 101, communicate with or receive and interpret signals from auxiliary user devices 170, and the like. In some embodiments, at least a portion of the user application (e.g., resource sharing management application 122, credential instrument application 124, etc.) may be stored on the memory device 140 of the resource technology system 106, and the user interface is presented on a display device of the user device 104, while in other embodiments, the user application is stored on the user device 104. The user 102 may subsequently navigate through the interface, perform one or more searches or initiate one or more activities or resource transfers using a user interface (e.g., graphical user interface 300, graphical user interface 400, graphical user interface 600) provided by the user application 122 of the user device 104. In some embodiments, the user 102 may be routed to a particular destination using the user device 104. In some embodiments, a purchase may be made by the user 102 using the user device 104. In some embodiments the auxiliary user device 170 requests and/or receives additional information from the resource technology system 106/the resource entity system 160 and/or the user device 104 for authenticating the user and/or the user device, determining appropriate transaction queues, performing the transactions and other functions.

FIG. 1 also illustrates the user device 104. The user device 104, or resource nodes 104 (104a, 104b, 170 etc.) herein referring to one or more user devices, wherein each device may generally comprise a communication device 110, a display device 112, a geo-positioning device 113, a processing device 114, and a memory device 116. The user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the resource entity system 160, the auxiliary user device 170 and the resource technology system 106. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 2. The display device 112 may comprise a screen, a speaker, a vibrating device or other devices configured to provide information to the user. In some embodiments, the display device 112 provides a presentation of the user interface (e.g., user interface 300, shared resource interface 400, etc.) of the integrated user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, microphones and the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, initiate activities, and interact with or receive and decode signals from other resource nodes or the auxiliary user devices 170, communicate with the resource technology system 106, authorize a transaction, conduct an interactive virtual exploration of a resource, and/or complete a resource provisioning activity or transaction using the user interface (e.g., user interface 300, shared resource interface 400, etc.) of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120, when executed by the processing device 114 are configured to cause the user device 104 and/or processing device 114 to perform one or more steps described in this disclosure, or to cause other systems/devices to perform one or more steps described herein.

As further illustrated in FIG. 1, the resource technology system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the resource entity systems 160, auxiliary user devices 170 and/or the user device 104. As such, the communication device 136 generally comprises a modem, server, wireless transmitters or other devices for communicating with devices on the network 101.

As further illustrated in FIG. 1, the resource technology system 106 comprises computer-readable instructions 142 stored in the memory device 140, which in one embodiment includes the computer-readable instructions 140 of a system resource application 144 (also referred to as a "system application"). The computer readable instructions 142, when executed by the processing device 138 are configured to cause the system 106/processing device 138 to perform one or more steps described in this disclosure to cause out systems/devices to perform one or more steps described herein. In some embodiments, the memory device 140 includes a data storage for storing data related to user transactions and resource entity information, but not limited to data created and/or used by the system resource application 144.

FIG. 1, further illustrates one or more auxiliary user devices, in communication with the network 101. The auxiliary user devices may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like. These devices may be associated with a first user, an auxiliary user and/or a resource provider user/individual.

In the embodiment illustrated in FIG. 1, and described throughout much of this specification, a "system" configured for performing one or more steps described herein refers to the resource sharing management application 122, that may perform one or more user activities either alone or in conjunction with the resource technology system 106, and specifically, the system application 144, one or more auxiliary user device 170, and the like The functions, and features of the enhanced resource sharing management platform with integrated resource activity features will now be described in detail. As such, the enhanced resource sharing management application, in some embodiments, is configured to function as an intelligent personal assistant and resource navigator and is configured to perform one or more resource activities by harnessing the functionality of multiple applications resident on the user device, for example, functionality of a resource sharing application 122 and another resource activity application (e.g., the credential instrument application 124) may be proactively provided on a single interface. In particular, the system is configured to present an integrated user interface (e.g., user interface 300) for communicating with the user, for execution of one or more user activities such as resource sharing and allocation, communicating and performing associated resource activities and functions, and for integrating the functionality of multiple applications (e.g., a resource sharing application such as a resource availability/surplus identification and allocation application for renting dwellings, and a resource activity application such as a financial application, an offer application and/or a personal assistant application) in a single interface, without requiring the user to access the multiple applications individually and be proficient in their operation. As such, the central user application is configured to perform one or more user resource sharing/allocation and associated activities in a convenient, proactive and timely manner.

Moreover, in some embodiments, the user interface (e.g., user interface 300, shared resource interface 400, etc.) is presented, in real-time, on multiple distributed network nodes via the resource sharing management application 122 or the user application 122. The resource sharing management interface associated with the user application 122 may be presented on the display device 112 of the user device 104 in response to receiving an indication from the user (for example, receiving a voice command from the user with an identifier associated with the resource sharing application, receiving a tactile indication or a fingerprint authentication form a home button of the device 104, and the like), automatically in response to detecting an action trigger (for example, determining that the user is attempting to perform a user activity by using a particular application, determining that the user has a surplus or deficiency of a particular resource, determining that a user resource is associated with a predetermined threshold value, determining that the user is at a predetermined location and the like), and the like.

As such, the system is configured to employ the foregoing technical features of the enhanced resource sharing management platform with integrated resource activity features to perform a myriad of user activities. In this regard, the system is configured to harness and present the content and functionality of a plurality of applications, typically associated with execution of a resource activity, in the user interface (e.g., user interface 300, shared resource interface 400, etc.). The various functions and features of the invention, will now be described herein. It is understood that these functions and features employ some or all of the aforementioned technical features.

FIG. 2 illustrates a high level process flow 200 directed to activity integration associated with a resource sharing management application, in accordance with one embodiment of the present invention. In particular, process flow relates to resource availability identification, resource selection, and virtual resource exploration and interaction. The features and functions of the process flow 200, may be performed, at least in part by the system 106 (hereinafter referred to as "the system") based on the at least one processing device 138 executing the computer-readable code 142 (e.g., computer readable instructions associated with the system resource application 144). In some embodiments, the system may transmit control instructions to cause other networked devices (e.g., user devices/resource nodes (104, 170), entity systems 190, financial institution system 180, and other databases and third-party systems) to perform one or more steps described herein. In some embodiments, a first user (either alone, or together with a group of users) seeks to reserve/provision an available resource.

Typically, the system is configured to initiate presentation of a resource sharing management application 122 (i.e., a user interface) on a first user device associated with the first user, wherein the resource sharing management application is configured to present a user interface on a display device of the first user device. In this regard, the system is configured to transmit, store, activate and/or invoke the resource sharing management application 122 on the first user device. In some embodiments, the system presents a graphical user interface 300 of the resource sharing management application 122 (illustrated by FIG. 3).

As alluded to previously, the system is configured to proactively and intuitively conduct resource sharing and allocation activities (e.g., using complex conversations with the user using a suitable communication channel or a suitable combination of communication channels), at least partially within the user interface (e.g., user interface 300, shared resource interface 400, etc.). In this regard, the system is configured to initiate presentation of the user interface of the application 122 and thereby provide resource information to the user, in response to a trigger (such as, based on analyzing user activity, based on a user input or short question and the like), without requiring the user to access and navigate multiple applications and their interfaces. For example, based on identifying a trigger event comprising a user purchase of tickets for a particular location, the system may determine that the user may require accommodation or may be seeking to plan a vacation for the duration of the stay at the particular location (the duration being greater that a predetermined minimum time interval).

In some embodiments, the system typically requires validation of authentication credentials of the first user (and/or other users in the user group) prior to performing one or more steps herein. In some instances, the system may receive authentication credentials from the user via an authentication input element 320 of the user interface 310 (illustrated in FIG. 3), or the system may authenticate the user based on biometric authentication or other forms of authentication. As another example, the system is configured for voice biometrics, and is configured to authenticate the users based on the users' audio credentials, both for the central user application and other applications of the user device, and also as a centralized authentication means for the one or more auxiliary devices. In this regard, the system may convey indications of successful authentication of the user to one or more auxiliary devices.

Next, as illustrated by block 210, the system is configured to identify at least one resource being associated with a resource availability (e.g., dwelling for rent/provisioning) at a predetermined time period (e.g., during an interval of month B-month C in a location/geographic region L), based on at least a user input received via the resource sharing management application 122. In some embodiments, the first user may provide particulars/attributes regarding the resource (such as geographic location/locality/city, predetermined time period for which the reservation is required, number of users in the user group, particular services/amenities desired, etc.), for example, via the resource provisioning configuration element 330 of interface 310 illustrated in FIG. 3. Here, in some embodiments, the system may identify multiple resources with resource availability (e.g., identify multiple resource providers/individuals that are seeking to rent a dwelling during the duration of the user's visit). The system may identify the most suitable available resources, such as dwellings, (e.g., based on received attributes from the user, based on a ranking system comprising locality meeting user requirements, dwelling type (number of rooms available, sharing/single accommodation, urban, rural, etc.), rating from past users, proximity to public transportation, and other parameters) and present them to the user on the user interface (e.g., user interface 300, shared resource interface 400, etc.) of the resource sharing management application 122. The user may review information associate with the dwelling view videos, pictures, select a particular resource, e.g., dwelling, for initiating a virtual interactive resource exploration, completing the reservation, and/or performing other tasks and the like from within the interface.

In addition to the features described above, the system is configured to provide a virtual tour of the dwelling to the user (and auxiliary users in the instances where the user is travelling with or provisioning the at least one resource for a group of users). As such, the system is structured to (i) allow a real-time virtual resource exploration of the at least one resource by each of the distributed network of nodes and (ii) provide real-time communication between each of the distributed network of nodes via the shared resource interface, via a shared resource interface of the application 122, as will be described in detail below. For example, the system may facilitate the foregoing by integrating with existing AR devices/headsets of the user (and/or auxiliary users), by providing immersive or interactive videos, by providing guided virtual tours, and/or the like, to facilitate the user's choice of a dwelling, a particular room in the dwelling, to facilitate the user reviewing facilities such as kitchen, laundry, and the like. In some embodiments, the system may initiate real-time audio/video communication, conversations, document/image/screen sharing, etc., (i) between the user's resource node (e.g., first resource node comprising user mobile device or computer, or a AR headset) and a resource node associated with the dwelling (e.g., a device associated with the user who is renting the dwelling), and/or (ii) between the user's resource node and resource nodes associated with auxiliary users such user's family members associated with the stay at the dwelling, within the central interface (e.g., without requiring opening and closing of other applications) to facilitate user's selection of a dwelling, as described below. After selection of a particular resource, the user may then request a presentation of a shared resource interface for interactive virtual exploration of the resource (e.g., using virtual resource exploration trigger element 340 of the interface 310 of FIG. 3).

In some embodiments, the system is structured to identify an optimal resource node or user device out of a plurality of devices associated with the first user, for presenting the foregoing real-time virtual resource exploration features. As discussed, the first user may be associated with multiple electronic devices or resource nodes (e.g., the plurality of resource nodes associated with the first user may comprise an AR headset, a smart wearable device, a smart television device, a mobile device, a computing device, the first user device and/another suitable electronic device). However, some of these devices may not be compatible with conducting the real-time virtual resource exploration features, for example, because the device/resource node does not comprise a suitable/compatible display for presenting the relevant interfaces, the device/resource node may be located at the first user's residence, while the first user is currently located at their office, the user may have previously indicated certain devices/resource nodes as being preferable, the user may be currently active of a certain device/resource node, and the like. As such, the system may receive, via the resource sharing management application 122, an indication from the first user to initiate the presentation of the shared resource interface across the distributed network of nodes. In response, the system may identify a plurality of resource nodes associated with the first user. Next, the system may ascertain that the first resource node of the plurality of resource nodes is optimal, based on at least (i) determining that the first resource node comprises a visual display device (e.g., a compatible display, a screen, a touch screen, a projector capable of projecting the interface onto a surface, etc.), (ii) determining that the first resource node is within a predetermined proximity of a location of the first user, and (iii) determining that the first user is currently active on the first resource node. In some embodiments, the first resource node is the first user device that the first user utilized to provide inputs thus far (e.g., a smartphone device). In some embodiments, the first resource node different from the first user device that the first user utilized to provide inputs thus far and hence may refer to another device or connected device such as a AR headset or a television display. The system may then cause a presentation of the shared user interface of the identified optimal first resource node.

As illustrated by block 220, the system is configured to identify an auxiliary user associated with the at least one resource. In some embodiments, the system is configured to identify whether the first user is seeking to provision the resource for the first user alone, or for a user group comprising the first user and one or more auxiliary users. The system may identify this based on the user input received via the resource sharing management application 122 (e.g. via configuration element 330 of interface 310 illustrated in FIG. 3). For example, the user may indicate that resource provisioning of the at least one resource is required for a user group comprising the first user and the auxiliary user(s). In other embodiments, the system may identify one or more auxiliary users based on trigger events (e.g., tickets being booked for a user group), based on historical user activities, based on user social media posts, based on user contact lists, and the like. In some embodiments, the auxiliary users may refer to users/individuals associated with the user who are not associated with the provisioning/renting or stay at/user of the at least one resource, and may refer to users/individuals that the first user wishes to consult regarding the at least resource. In some embodiments, the auxiliary user may refer to the resource provider user/individual associated with/ offering the at least one resource. In response to identifying the auxiliary user(s), the system may present indicators associated the identified one or more auxiliary users on the user interface of the application 122 on the first user device. For example, FIG. 3 illustrates a presentation of indicators 342 associated with three identified auxiliary users, viz., "user 2", "user 3" and "user 4". The first user may then select one or more of the identified auxiliary users to be included in or granted access to the visual resource exploration platform (illustrated in FIG. 4), as indicated by selection element 344 in FIG. 3.

In response to receiving a selection of an auxiliary user from the first user, in some embodiments, the system is structured to identify an optimal auxiliary resource node or user device out of a plurality of auxiliary devices/resource nodes associated with the selected auxiliary user, for presenting the foregoing real-time virtual resource exploration features. This may be substantially similar to that of the determination of the optimal first resource node for the first user described above. As discussed, the auxiliary user may be associated with multiple electronic devices or resource nodes (e.g., the plurality of resource nodes associated with the first user may comprise an AR headset, a smart wearable device, a smart television device, a mobile device, a computing device and/another suitable electronic device). In response to identifying a plurality of resource nodes associated with the auxiliary user, the system may then identify the most optimal resource node. In particular, the system may determine the optimal auxiliary resource node of the plurality of resource nodes based on at least (i) determining that the auxiliary resource node comprises a visual display device, (ii) determining that the auxiliary resource node is within a predetermined proximity of a location of the auxiliary user, and (iii) determining that the auxiliary user is currently active on the first resource node. In some embodiments, the system is structured to transmit a trigger signal to the optimal auxiliary resource node. The trigger signal is structured to cause the auxiliary resource node to present, in real-time, the shared resource interface. Also, for example in the event that auxiliary user is not currently active of the identified optimal auxiliary resource node, the system may transmit, a notification to an active resource node of the plurality of resource nodes indicating the presentation of the shared resource interface on the auxiliary resource node (inactive), to cause the auxiliary user to activate the inactive device.

In some embodiments, the auxiliary user refers to the resource provider/individual associated with offering the at least one resource. In such instances, the identified optimal auxiliary resource node may refer to a visual capture device associated with the resource provider, to facilitate the resource provider giving a virtual tour of the at least one resource to the first user (e.g., using a real-time feed from the visual capture device).

In response to identifying optimal resource nodes, i.e., the first resource node associated with the first user and the auxiliary resource node associated with the auxiliary user, the system is configured to establish an operative communication channel between the first resource node and the auxiliary resource node, via the network 101. That said, the system, and specifically the resource sharing management application 122 of the user device 104 is configured to establish operative communication channels with auxiliary user devices 170, operating systems/personal assistants associated with the auxiliary user devices 170, and/or other personal assistants associated with the user device 104 itself. As such, the system is configured for seamless integration with existing personal digital assistants of the user device, and transfer control to and from the assistants, in real time, for execution of user activities. In some embodiments, the system is configured to communicate with resource nodes/ auxiliary devices such as virtual reality (VR) headsets, augmented reality (AR) devices and the like.

Next, as illustrated by block 230, the system is structured to initiate a presentation of a shared resource interface across a distributed network of nodes (e.g., each of the first resource node and the auxiliary resource node), such that a real-time view of the shared resource interface is presented on each node of the distributed network of nodes. The shared interface maybe presented for a predetermined time interval, e.g., for a predetermined duration, until the first user requests ceasing the presentation, until selection of the at least one resource for provisioning, etc. As discussed, the shared resource interface is structured to (i) allow a real-time virtual resource exploration of the at least one resource by each of the distributed network of nodes and (ii) provide real-time communication between each of the distributed network of nodes via the shared resource interface. This shared interface 410, in accordance with some embodiments, is illustrated in FIG. 4.

The shared resource interface 410 typically comprises a real-time virtual resource exploration component 420 (illustrated in FIG. 4). As such the system may present, on each of the resource nodes of the distributed network (e.g., each of the first resource node and the auxiliary resource node), the real-time virtual resource exploration component 420, as indicated by block 240. The real-time virtual resource exploration component 420 comprises an interactive audio-visual stream 422 associated with the at least one resource. The interactive audio visual stream 422 may be captured in-real time at the location of the at least one resource, or maybe retrieved from a previously captured video file (e.g., a 360° interactive video file). In some embodiments, the first user (and/or the auxiliary user) may rotate, revolve, perform a virtual walk through or otherwise navigate the interactive audio visual stream 422, for instance, using action elements 426. Here, the system may identify, in real-time, a current view of the interactive audio visual stream 422 being displayed. The system may identify resource attributes, amenities and other features of the at least one resource visible in the current view and overlay associated graphical overlay elements (424*a*, 424*b*).

The real-time virtual resource exploration component 420 is interactive and facilitates real-time communication between each of the distributed network of nodes via the shared resource interface 410. As such the system is configure to identify gestures, actions, speech, and other communications at one of the resource nodes, and instantaneously convey the same to all of the resource nodes, as indicated by block 250 of FIG. 2. For instance, the system may identify a predetermined gesture performed by the first user on the shared interface 410 presented on the first resource node. The gesture may be associate with a touch screen gesture, a voice command, a spatial gesture, and/or the like. The system may then transmit a first trigger signal to the first resource node to cause the first resource node to present, in real-time, a first graphical communication overlay element (e.g., elements 434 and/or 436 illustrated in FIG. 4) over a display of the interactive audio-visual stream of the shared resource interface presented on the first resource node. Similarly, simultaneously with the first trigger signal, the system may transmit a second trigger signal to the auxiliary resource node to cause the auxiliary resource node to present, in real-time, a second graphical communication overlay element (e.g., identical to the first graphical communication overlay element 434 and/or 436) over a display of the interactive audio-visual stream 422 of the shared resource interface 410 presented on the auxiliary resource node, as indicated by block 260 of FIG. 2.

This graphical communication overlay element associated with the predetermined gesture is structured to be dynamic on each of the displays of the interactive audio-visual stream 422 across the distributed network. Specifically, the system may identify the particular portion of the current view of the interactive audio visual stream 422 being displayed on the first user device, which pertains to the first user's gesture. The system may then continuously track, update or otherwise modify the position and/or size of the graphical overlay element as the current views of the interactive audio visual stream 422 change, such that the graphical overlay element still points to the particular portion through the variation of the views of the stream on each of the displays of the interactive audio-visual stream 422 across the distributed network. The system may cease the display or remove the first graphical communication overlay element (e.g., elements 434 and/or 436 illustrated in FIG. 4). Moreover, the system gestures, actions, speech, and other communications at each of the resource nodes, in real-time and present the same at the real-time communication log component 432 illustrated in FIG. 4, as they explore/access the at least one resource. The system may then receive, via the shared resource interface presented on the first resource node, a selection of the at least one resource for resource provisioning, as indicated by block 270 of FIG. 2. Subsequently, the system may initiate provisioning or reservation of the at least one resource on behalf of the first user, as will be described with respect to FIG. 5. For instance, the system may transmit a control signal to a resource provider node associated with the at least one resource to reserve the resource (e.g., dwelling) for the predetermined time period.

Moreover, the system may initiate presentation of the shared user interface (e.g., shared resource interface 400, etc.), seamlessly, on displays associated with the axially VR and AR devices. In some instances, the system is configured to transfer an existing conversation of the user interface 300 to the shared resource interface 400, to other personal digital assistant interfaces or other auxiliary device, for performance of further steps. In this regard, the system is configured to update the personal digital assistant or the auxiliary device regarding the most recent dialogue, future activities/steps to be performed, status of the current conversation, and the like.

FIG. 3 illustrates a graphical user interface 300 associated with a resource sharing management application, in accordance with one embodiment of the present invention. In particular, FIG. 3 illustrates a view 300 of a user interface 310 of the resource sharing management application 122. As discussed, the system is configured to initiate presentation of a user interface 310 associated with the resource sharing management application 122, e.g., on a first user device associated with the first user. In this regard, the system is configured to transmit, store, activate and/or invoke the resource sharing management application 122 on the first user device, and further trigger the presentation of the interface 310. The interface 310 compromises an authentication input element 320 for receiving authentication credentials from the first user, as discussed previously. The user interface 310 further comprises a resource provisioning configuration element 330 structured for receiving particulars/attributes regarding the resource (such as geographic location/locality/city, predetermined time period for which the reservation is required, number of users in the user group, particular services/amenities desired, requirement of a resource availability corresponding to a time interval of month B-month C in a location/geographic region L, etc.), ad described above.

After selection of a particular resource, the user may then request a presentation of a shared resource interface for interactive virtual exploration of the resource using the virtual resource exploration trigger element 340. Here, the user interface 310 may include a presentation of indicators 342 associated with identified auxiliary users, e.g., "user 2", "user 3" and "user 4". The first user may then select one or more of the identified auxiliary users to be included in or granted access to the visual resource exploration platform (i.e., shared resource interface 410 illustrated in FIG. 4), as indicated by selection element 344. The system may subsequently initiate the presentation of the shared resource interface 410 illustrated in FIG. 4.

Moreover, as illustrated by FIG. 3, the graphical user interface 310 may comprise a credential instrument application portion 350 associated with performing resource transfers/financial payments for completing the reservation of the at least one resource. In some embodiments, the system is structured to access a credential instrument application 124 (e.g., a digital wallet application or a banking application associated with the first user) stored on the first user device. The system may then extract and insert a presentation of a portion of a credential instrument application interface 350 (including aesthetic appearance and functionality) within the user interface of the resource sharing management application, so that the first user may complete the resource reservation activities without having to access multiple applications. The credential instrument application portion 350 may comprise one of more credential instruments (e.g., payment credentials, payment tokens, credit card/account identifiers, etc.). As such, the system may receive a selection of a user credential instrument from the first user, via the portion of the credential instrument application 350 presented within the user interface 310 of the resource sharing management application 122.

FIG. 4 illustrates a graphical user interface 400 associated with a resource sharing management application, in accordance with one embodiment of the present invention. In particular, FIG. 4 illustrates a view 400 of a shared user interface 410 of the resource sharing management application 122, as alluded to with respect to FIGS. 2 and 3. As discussed, the system is configured to initiate presentation of the shared user interface 410 on each of the distributed network of nodes (e.g., a first resource node and an auxiliary resource node). As discussed, the first user may select one or more of the identified auxiliary users to be included in or granted access to the visual resource exploration platform, i.e., the shared resource interface 410. The shared resource interface 410 may comprise indicators (442*a*, 422*b*) indicating the users currently accessing the shared interface 410. The indicator 442*a* may refer to the first user, while the indicator 422*b* may refer to the one or more auxiliary users.

The shared resource interface 410 typically comprises a real-time virtual resource exploration component 420. As such the system may present, on each of the resource nodes of the distributed network (e.g., each of the first resource node and the auxiliary resource node), the real-time virtual resource exploration component 420. The real-time virtual resource exploration component 420 comprises an interactive audio-visual stream 422 associated with the at least one resource. The interactive audio visual stream 422 may be captured in-real time at the location of the at least one resource, or maybe retrieved from a previously captured video file (e.g., a 360° interactive video file). In some embodiments, the first user (and/or the auxiliary user) may rotate, revolve, perform a virtual walk through or otherwise navigate the interactive audio visual stream 422, for instance, using action elements 426. The user's progress through the at least one resource's layout may be indicated using a layout map indicator 444. Moreover, as discussed, the system may identify, in real-time, a current view of the interactive audio visual stream 422 being displayed. The system may identify resource attributes, amenities and other features of the at least one resource visible in the current view and overlay associated graphical overlay elements (424*a*, 424*b*).

As alluded to previously, the system is also configured to execute complex tasks within a single user interface (e.g., user interface 300, shared resource interface 400, etc.). The first user may perform the user activity of making a reservation of a dwelling with availability during a certain time period using a single interface 300 and/or 400, without requiring separate access to an authentication application, a resource allocation application, a digital wallet application and the like.

As discussed, the system is configure to identify gestures, actions, speech, and other communications at one of the resource nodes, and instantaneously convey the same to all of the resource nodes. For instance, the system may identify a predetermined gesture performed by the first user on the shared interface 410 presented on the first resource node. The gesture may be associate with a touch screen gesture, a voice command, a spatial gesture, and/or the like. The system may then transmit a first trigger signal to the first resource node to cause the first resource node to present, in real-time, a first graphical communication overlay element (e.g., elements 434 and/or 436 illustrated in FIG. 4) over a display of the interactive audio-visual stream of the shared resource interface presented on the first resource node. Similarly, simultaneously with the first trigger signal, the system may transmit a second trigger signal to the auxiliary resource node to cause the auxiliary resource node to present, in real-time, a second graphical communication overlay element (e.g., identical to the first graphical communication overlay element 434 and/436) over a display of the interactive audio-visual stream 422 of the shared resource interface 410 presented on the auxiliary resource node.

This graphical communication overlay element associated with the predetermined gesture is structured to be dynamic on each of the displays of the interactive audio-visual stream 422 across the distributed network. Specifically, the system may identify the particular portion of the current view of the interactive audio visual stream 422 being displayed on the first user device, which pertains to the first user's gesture. The system may then continuously track, update or otherwise modify the position and/or size of the graphical overlay element as the current views of the interactive audio visual stream 422 change, such that the graphical overlay element still points to the particular portion through the variation of the views of the stream on each of the displays of the interactive audio-visual stream 422 across the distributed network. The system may cease the display or remove the first graphical communication overlay element (e.g., elements 434 and/or 436 illustrated in FIG. 4). Moreover, the system gestures, actions, speech, and other communications at each of the resource nodes, in real-time and present the same at the real-time communication log component 432 illustrated in FIG. 4, as they explore/access the at least one resource. The system may then receive, via the shared resource interface presented on the first resource node, a selection of the at least one resource for resource provisioning, e.g., via the interface 410.

FIG. 5 illustrates a high level process flow 500 directed to activity integration associated with a resource sharing management application, in accordance with one embodiment of the present invention. In particular, process flow relates to resource provisioning activity identification, and added resource identification and execution. The features and functions of the process flow 500, may be performed, at least in part by the system 106 (hereinafter referred to as "the system") based on the at least one processing device 138 executing the computer-readable code 142 (e.g., computer readable instructions associated with the system resource application 144). In some embodiments, the system may transmit control instructions to cause other networked devices (e.g., user devices/resource nodes (104, 170), entity systems 190, financial institution system 180, and other databases and third-party systems) to perform one or more steps described herein. In some embodiments, a first user (either alone, or together with a group of users) seeks to reserve/provision an available resource.

As illustrated by block 510, the system is configured to identify at least one resource being associated with a resource availability (e.g., dwelling for rent/provisioning) at a predetermined time period (e.g., during an interval of month B-month C in a location/geographic region L), based on at least a user input received via the resource sharing management application 122, as discussed previously with respect to process flow 200 of FIG. 2. As illustrated by block 520, system may receive, via the shared resource interface 410 presented on the first resource node, a selection of the at least one resource for resource provisioning.

Reservation of each resource and/or utilization of the resource typically involves associated resource provisioning activities. The present invention provides, highly customized and streamlined identification and execution of the associated resource provisioning activities for the first user along with the reservation/provisioning of the at least one resource.

The first user may not be aware of these required activities at all. Moreover, the user may have to access various other search engines, resource applications, offer applications, to even determine associated resource provisioning activities, much less execute resource activities and identify associated added resources (e.g., offers, rebates) that are locally valid at the geographic location of the at least one resource and that are valid during the time of the user's stay/utilization of the at least one resource. As an example, after making a reservation of a dwelling for a particular time period, the user may not be aware that that the dwelling requires a pre-paid parking ticket for a nearby parking lot, may not be aware of a grocery store nearby or that the store allows prior online booking a pick-up/delivery of items, a particular visit/ activity that the user desired to accomplish during the stay in the dwelling requires tickets to be picked-up prior to a predetermined time in the morning, and the like.

Here, based on a trigger of the user's choice of a particular dwelling (e.g., the user reviewing the listing of the dwelling on an interface of the resource sharing management application 122 for a predetermined amount of time, the user selecting and/or reserving the dwelling and the like), the system may retrieve historical resource parameters associated with the at least one resource, as indicated by block 530. The historical resource parameters may comprise crowd-sourced data associated with past users that had previously rented the dwelling (e.g., based on social media posts, financial activities, purchase activities within a predetermined proximity of the dwelling, and the like), data associated with users residing within a predetermined proximity to the dwelling, e.g., within the same building, same street, or same locality, merchant data associated with entities within a predetermined proximity of the dwelling (e.g., same locality, same city, etc.), user data (comprising user preferences, likes, itinerary, user public social media posts), and/or the like. In some instances, retrieving the data comprises security features such as blocking, eliminating, removing, encrypting, or writing over personal or identifying information associated with the past user data, such that the privacy of the users can be maintained and such that the users cannot be identified based on the data.

The system may identify resource attributes associated with the at least one resource. The resource attributes may comprise reservation dwelling location (e.g., precise dwelling location attributes: location, locality, city, zipcode, and/or type of dwelling location attributes: urban dwelling, rural dwelling, locality closest to the city center, and/or the like), dwelling type (e.g., apartment, rooms, sharing accommodation, single accommodation, and the like), time period and/or duration of past reservation (e.g., summer, winter, month A, 2 days duration, 5 weeks duration, and/or the like), amenities available, services available, and/or other features and attributes. The system may also identify user attributes associated with the first user. The user attributes may comprise the user data (residence city, occupation, and the like), number of people associated with the past stays/resource reservations of the user (e.g., the number of family members that stayed at the dwelling), past user resource reservations, feedback provided by the user for past resource reservations, and/or the like.

Based on at least the resource attributes and the user attributes, the system may parse the historical data (e.g., a large subset of historical data, or large subset of crowd-sourced data) stored at a data storage device to produce the historical resource parameters. The historical resource parameters comprise historical activity data associated with a plurality of individuals such that at least (i) the historical activity data matches the resource attributes and (ii) the plurality of individuals' attributes match the user attributes. "Matching" as used herein refers to at least a partial match or correspondence or overlap of the attributes. For example, the system may parse large subset of historical data to identify a portion of past comprising data associated with past users (i) that are most similar to the user (e.g., occupation, residence city, family data, and/or the like), (ii) whose reservation are most similar to the dwelling reservation data (e.g., dwelling location, reservation time and/or duration, number of people associated with the reservation, and/or the like), and/or (iii) whose activities/services availed/visits performed during the stay at the dwelling are most similar to the anticipated activities of the user (e.g., sight-seeing, museum tours, grocery purchase, work visit, and/or the like).

Next, as indicated by block 540, the system is configured to determine a resource provisioning activity associated with the at least one resource based on at least the historical resource parameters. The resource provisioning activity is typically associated with a predetermined geographical area associated with the at least one resource. For instance, the system may determine resource activities for the user most likely required by the user (e.g., using a ranking system based on the number/frequency of data points associated with past users) for the reservation/stay at the dwelling. For example, the system may determine that the user on a work visit would be seeking to drive during the stay at the dwelling, and identify a particular vehicle rental location utilized by past users that are similar to the user and who had previously stayed in or around the dwelling also for a work visit. As another example, the system may determine that the user is visiting the dwelling along the user's family comprising 2 children. Here, based on past user data associated with past users who also stayed in similar cities/locations/ accommodations such as the dwelling, the system may determine resource activities such as, that the users are likely to utilize kitchen services of the dwelling, or that similar past users visited certain locations that cater to children. Consequently, the system may identify a nearby grocery delivery service/grocery store, identify museum tickets for the child-friendly locations, and the like. As such, in the instances where the user is performing the reservation or provisioning of the at least one resource for a user group comprising the first user and the auxiliary user, the system may further determine the resource provisioning activity associated with the at least one resource by parsing the historical resource parameters comprising historical activity data associated with a plurality of individuals. This parsing maybe performed, based on at least one of (i) determining that an individual group of the plurality of individuals associated with the resource provisioning activity corresponds to the user group, (ii) determining that a date associated with the resource provisioning activity corresponds to the predetermined time period, and (iii) determining that the resource provisioning activity corresponds to anticipated activities of the first user.

Next, as illustrated by block 550, identify an added resource associated with the resource provisioning activity. The added resource refers to rebates, or offers associated with performing the resource provisioning activity, and which are active/valid at the predetermined geographical area of the at least one resource and the predetermined time period of the resource reservation. Here, in some embodiments, the system identifies a plurality of entities (e.g., merchants, vendors, businesses, organizations, etc.) associated with performing the resource provisioning activity in the predetermined geographical area associated with the at least one resource. The system may then determine an optimal first entity of the plurality of entities for performing the resource provisioning activity. This determination maybe made based on at least one of (i) determining that a location of first entity in within a first predetermined distance from a geographical location of the at least one resource, (ii) determining that the location of first entity in within a second predetermined distance from a geographical location of an itinerary of the first user associated with the predetermined time period, and (iii) determining that the first entity matches an entity associated with the historical activity data associated with the plurality of individuals. Next, based on receiving a signal from an entity system 190 associated with the first entity, the system may identify added resource(s) offered by the first entity that are associated with performing the resource provisioning activity at the predetermined geographical area and the predetermined time interval.

Subsequently, as indicated by block 560, the system may present, via the resource sharing management application, the resource provisioning activity and the identified added resource to the first user on the display device of the first user device. The system may present the determined user activities to the user (e.g., as images, overlays, backgrounds, text, and/or the like, illustrated by resource provisioning activity element 624 of FIG. 6), along with identified rebates/coupons, for example, within the shared interface (410, 610) or the user interface 310 of the resource sharing management application 122 (e.g., added resource element 630 of FIG. 6). Moreover, as illustrated by FIG. 6, the system may also present graphical element overlays (626a, 626b) associated with the previously identified historical resource activities of a plurality of individuals, relative to a geographic location 622 of the at least one resource, within a map of the predetermined geographical area.

In addition, the system may insert functionality of associated applications (e.g., merchant applications, coupon applications, ticket purchase applications associated with the identified likely visits), to facilitate completion of the determine user activities from within the interface 620. Moreover, the system may customize the interface based on the identified resource activities. For example, based on determining that the user seeks to visit a museum during the stay at the swelling, the system may provide customer overlays, backgrounds, logos, interactive functionality and the like that are associated with the museum.

Next, as illustrated by block 570 of FIG. 5, the system is configured to initiate provisioning of the at least one resource based on receiving a first user confirmation from the first user, e.g., via any of the interfaces 300, 400 or 600. As discussed previously, the system is structured to access a credential instrument application stored on the first user device and cause a presentation of a portion of a credential instrument application interface 350 within the user interface of the resource sharing management application. The system may receive a selection of a particular user credential instrument from the first user, via the portion of the credential instrument application presented within the user interface of the resource sharing management application. The system may then initiate a resource transfer (e.g., payment transfer) from the selected user credential instrument to a resource provider credential instrument associated with the at least one resource.

As illustrated by block 580 the system is also configured to initiate execution of the determined resource provisioning activity using the added resource within the predetermined geographical area based on receiving a second user confirmation from the first user. Typically, the system may receive an activity trigger signal comprising an indication of initiation of the resource provisioning activity at a first entity by the first user, e.g., during the user's visit/utilization of the at least one resource. The system may then transmit, to an entity system (e.g., system 190) associated with the first entity, a control signal structured to cause the first entity to supplement a resource transfer value, apply the associated rebate to the resource provisioning activity.

FIG. 6 illustrates a graphical user interface 600 associated with a resource sharing management application, in accordance with one embodiment of the present invention. In particular, FIG. 6 illustrates a view 600 of a shared user interface 610 (or user interface 610) of the resource sharing management application 122. As discussed, the system is configured to initiate presentation of a user interface 610 associated with the resource sharing management application 122, e.g., on a first user device associated with the first user. The interface 610 comprises a resource provisioning activity component 620, having graphical element overlays (626a, 626b) associated with the previously identified historical resource activities of a plurality of individuals, relative to a geographic location 622 of the at least one resource, within a map of the predetermined geographical area. The interface 610 further comprises a presentation of the determined resource provisioning activity activities to the user at the resource provisioning activity element 624, along with identified rebates/coupons indicated by the added resource element 630.

In addition to the features described above, in some embodiments, the invention is configured for integration of personal digital assistant functionality within a user interface (e.g., user interface 300, shared resource interface 400, etc.). As discussed previously, the enhanced resource sharing management application, is configured to function as an intelligent personal assistant and resource navigator and is configured to perform one or more resource activities by harnessing the functionality of multiple applications resident on the user device, for example, functionality of a resource sharing application and another resource activity application may be proactively provided on a single interface, for example, via interfaces overlaid over each other.

Here, in some instances, the user interface (e.g., user interface 300, shared resource interface 400, etc.) is a computer human interface, and specifically a natural language user interface for receiving user input (for example, for creating, selecting and modifying data/functionality), presenting information regarding user activities, providing output to the user, and otherwise communicating with the user in a natural language of the user. The natural language of the user comprise linguistic phenomena such as verbs, phrases and clauses that are associated with the natural language of the user. The system is configured to receive, recognize and interpret these linguistic phenomena of the user input and perform user activities accordingly. In this regard, the system is configured for natural language processing and computational linguistics. In many instances, the system is intuitive, and is configured to anticipate user requirements, data required for a particular activity and the like, and request activity data from the user accordingly.

In particular, the system is configured to present an integrated user interface (e.g., user interface 300, shared resource interface 400, etc.) for communicating with the user using audio, visual, and/or textual natural speech conversations with the user, for execution of one or more user activities such as resource sharing and allocation, communicating and performing associated resource activities and functions, and for integrating the functionality of multiple applications (e.g., a resource sharing application such as a resource availability/surplus identification and allocation application for renting dwellings, and a resource activity application such as a financial application, an offer application and/or a personal assistant application) in a single interface, without requiring the user to access the multiple applications individually and be proficient in their operation.

As described above, the personal digital assistant feature of system is intuitive and is configured to hold complex and branched conversations with the user, in the pursuit of completing one or more resource activities. In this regard, the system is configured to detect and conduct branched conversations using intelligent complex path looping. In some instances, the system may identify a suitable conversation path for completion of a user initiated activity, and proceed to request information accordingly. For example, for a user activity of making reservations for a dwelling at location A, the system may determine a conversation path comprising requesting preferred dwelling parameters (e.g., type, cost, timeframe, features, proximity to other auxiliary locations B and/or C), presenting one or more suitable dwellings (e.g., images, videos, text) retrieved from the system based on parameters received from the user, presenting proactively one or more resource activities and/or services associated with the dwelling (e.g., based on analyzing crowdsourced data, system data associated with users who had previously reserved/stayed at the dwelling, data associated with residents within a predetermined proximity of the dwelling), receiving a selection of a particular dwelling, receiving a time for the reservation and the number of people for the reservation, and the like. Subsequently, the system may automatically make reservations and allocate resources for the user at the chosen dwelling.

Moreover, in some embodiments, the present invention is configured for intelligent path looping and payment integration. In addition, the intelligent complex path looping of the invention enables the system to loop back to the original conversation path for completion of the activity in the instances where the user digresses or the conversation branches out. For the example of the user seeking to perform a payment transfer, for example, the system may receive a user input to perform a payment associated with the reservation of an available resource at a particular node, e.g., a reservation of a dwelling. In response, the system may request the resource value or amount to be transferred, as a part of a determined original conversation path. The user may then seek information regarding balances of one or more resources of the user, such as a savings account, a checking account, and the like, branching out from the original conversation path into a first level branch. The system may then provide the real-time balances of the resources. The user may then seek information regarding minimum balances of the resources, expected resource transfers such ad deposits, most recent account activity, and the like, further branching out from the preceding dialogue into second, third and/or fourth level branches. However, the system comprises a content buffer for temporarily storing a predetermined number of dialogues or conversation branches or a particular conversation for conducting a user activity. Based on determining that the predetermined number of dialogues or conversation branches have occurred, the system may loop back, automatically, to the original conversation path and request a transfer confirmation, choice of account, and the like from the user, and the like for the completion of the resource transfer. Alternatively, the system may receive a user input comprising a transfer amount and a choice of an account from the user, and determine, automatically based on the content buffer, that the user is now referring to the original conversation path, and loop back to the original conversation path accordingly. Continuing with the previous example, the system is further configured for multilevel temporal conversation correlation. Here the system may seek and receive an indication from the user to perform the transfer at a later time, for example, within a predetermined time interval after receiving a check-in notification from the resource availability node associated with the dwelling being reserved. Here, the system is configured to correlate the new user input to the historical original conversation part, and subsequently perform the transfer.

Here, the system may also link the financial account of the recipient associated with the dwelling reservation with the system to and conduct the transfer using a P2P payment application in coordination with a digital wallet application on the user's mobile device. Here, for example, the system may send the payment to a credit card associated with the recipient. Consequently, the system may present the functionality of the P2P payment application and/or the digital wallet application within the interface of the enhanced resource sharing management application to facilitate completion of the payment transfer. In addition, the system may integrate payment sharing functionality into the interface to enable the user to share or spilt the payment with multiple auxiliary users.

In some embodiments, the system may provide a new payment vehicle to the user, for example, a credit card to the digital wallet of the user, in near real time to facilitate the payment transaction. For example, the system may provide a new payment vehicle suitable for the geographic region that the user is travelling to, a vehicle that provides certain rebates and the like. In some embodiments, the system provides foreign exchange services to facilitate overseas payments.

Moreover, the system may analyzer user information, e.g., user financial information and determine that the user may utilize existing gift cards, travel benefits, other accounts, to complete at least a portion of the payment for the dwelling reservation, and provide specific interfaces/overlays to facilitate the user of benefits, gift cards and the like. In addition, the system may transmit electronic gift cards to the user's device, for example, gift cards that may be redeemed during the stay at the dwelling, which may be redeemed at a particular local merchant, etc.

In some embodiments, the present invention is configured for customized reservation alerts. Here, the system provides customized alerts to the user, for example, using the user's mobile device or other computers/smart devices, regarding the reservation of the dwelling itself (e.g., travel reminders, purchase of travel insurance) and/or regarding the associated resource activities (e.g., to purchase museum tickets using the identified locally valid rebates that are set to expire within a predetermine time interval.)

In some embodiments, the present invention is configured for entity integration (i.e., small business integration). Here, the system provides a platform for merchants to provide, change and manage locally valid rebates to be utilized along with the dwelling reservation. Here the system may provide a separate portal for merchant node systems to connect with the network and provide these rebates. The system may parse these rebates, identify pertinent rebates and provide them to the user before, during and/or after the reservation or stay at the dwelling. In some instances, the system provides these portals to the resource nodes associated with the host user offering the dwelling for rental.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for activity integration associated with a resource sharing management application, the system comprising an enhanced resource sharing management platform with integrated resource activity features for performing resource activities in an integrated manner from a single interface and for establishing intelligent and responsive communication with a distributed network, the system comprising:
- at least one memory device with computer-readable program code stored thereon;
- at least one communication device;
- at least one processing device operatively coupled to the at least one memory device and the at least one communication device, wherein executing the computer-readable code is configured to cause the at least one processing device to:
  - initiate presentation of a user interface associated with a resource sharing management application on a first user device associated with a first user, wherein the resource sharing management application is configured to present the user interface on a display device of the first user device;
  - identify at least one resource associated with a resource availability at a predetermined time period;
  - identify an auxiliary user associated with the at least one resource;
  - identify an optimal first resource node of a plurality of resource nodes associated with the first user that is compatible for presenting a shared resource interface, comprising:
    - determining that a second resource node of the plurality of resource nodes is not compatible based on at least determining that (i) the second resource node does not comprise a predetermined compatible display device, and (ii) determining that the first user is not currently active on the second resource node; and
    - determining that the first resource node is compatible based on at least (i) determining that the first resource node comprises a visual display device, (ii) determining that the first resource node is within a predetermined proximity of a location of the first user, and (iii) determining that the first user is currently active on the first resource node;
  - establish an operative communication channel between the first resource node associated with the first user and an auxiliary resource node associated with the auxiliary user;
  - initiate presentation of the shared resource interface across a distributed network of nodes such that a real-time view of the shared resource interface is presented on each node of the distributed network of nodes for a predetermined time interval, wherein the distributed network nodes comprises the first resource node and the auxiliary resource node, wherein the shared resource interface is structured to (i) allow a real-time virtual resource exploration of the at least one resource by each of the distributed network of nodes and (ii) provide real-time communication between each of the distributed network of nodes via the shared resource interface, wherein the real-time virtual resource exploration of the at least one resource by each of the distributed network of nodes further comprises:
    - presenting, a real-time virtual resource exploration component comprising an interactive audio-visual stream associated with the at least one resource on each of the distributed network of nodes;
    - identifying a predetermined gesture performed by the first user on the first resource node;
    - identifying a current view portion of the interactive audio-visual stream currently being displayed of the first user on the first resource node;
    - overlaying a graphical overlay element associated with the predetermined gesture on the interactive audio-visual stream;
    - continuously tracking the position of the graphical overlay element with respect to the interactive audio-visual stream;
    - modifying the graphical overlay element in response to a change in current view portion of the interactive audio-visual stream of the first user on the first resource node; and
    - removing the graphical overlay element from the interactive audio-visual stream;
  - determine a resource provisioning activity associated with the at least one resource based on at least historical resource parameters associated with the at least one resource, wherein the resource provisioning activity is associated with a predetermined geographical area associated with the at least one resource;
  - identify an added resource associated with the resource provisioning activity, wherein the added resource is associated with the predetermined geographical area and the predetermined time period;
  - present, via the resource sharing management application, the resource provisioning activity and the identified added resource to the first user on the display device of the first user device;
  - initiate provisioning of the at least one resource based on receiving a first confirmation from the first user; and
  - initiate execution of the determined resource provisioning activity using the added resource within the predetermined geographical area based on receiving a second confirmation from the first user.

2. The system according to claim 1, wherein establishing an operative communication channel between the first resource node associated with the first user and the auxiliary resource node associated with the auxiliary user further comprises:
- receiving, via the resource sharing management application, an indication from the first user to initiate the presentation of the shared resource interface across the distributed network of nodes.

3. The system according to claim 2, wherein the plurality of resource nodes associated with the first user comprise an Augmented Reality (AR) headset, a smart wearable device, a smart television device, a mobile device, a computing device and the first user device.

4. The system according to claim 1, wherein establishing the operative communication channel between the first resource node associated with the first user and the auxiliary resource node associated with the auxiliary user further comprises:
- receiving, via the resource sharing management application, a virtual session indication from the first user to initiate the presentation of the shared resource interface across the distributed network of nodes, wherein the virtual session indication comprises a selection of the auxiliary user;
- identifying a plurality of resource nodes associated with the auxiliary user;
- determining the auxiliary resource node of the plurality of resource nodes based on at least (i) determining that the auxiliary resource node comprises a visual display device, (ii) determining that the auxiliary resource node is within a predetermined proximity of a location of the auxiliary user, and (iii) determining that the auxiliary user is currently active on the first resource node;

transmitting a trigger signal to the auxiliary resource node, wherein the trigger signal is structured to cause the auxiliary resource node to present, in real-time, the shared resource interface; and transmitting, a notification to an active resource node of the plurality of resource nodes indicating the presentation of the shared resource interface on the auxiliary resource node.

5. The system according to claim 4:

wherein the at least one resource associated with the resource availability at the predetermined time period is identified based on at least a user input received via the resource sharing management application;

wherein the user input, received via the resource sharing management application, comprises an indication for provisioning the at least one resource for a user group comprising the first user and the auxiliary user;

wherein the plurality of resource nodes associated with the auxiliary user comprise an AR headset, a smart wearable device, a smart television device, a mobile device and a computing device.

6. The system according to claim 4, wherein the auxiliary user is associated with providing the at least one resource for provisioning, wherein the plurality of resource nodes associated with the auxiliary user comprise a visual capture device.

7. The system according to claim 1, wherein executing the computer-readable code is configured to further cause the at least one processing device to:

transmit a first trigger signal to the first resource node, the first trigger signal being structured to cause the first resource node to present, in real-time, a first graphical communication overlay element over a display of the interactive audio-visual stream of the shared resource interface presented on the first resource node, wherein the first graphical communication overlay element is associated with the predetermined gesture performed by the first user; and transmit a second trigger signal to the auxiliary resource node, the second trigger signal being structured to cause the auxiliary resource node to present, in real-time, a second graphical communication overlay element over a display of the interactive audio-visual stream of the shared resource interface presented on the auxiliary resource node, wherein the second graphical communication overlay element is associated with the predetermined gesture performed by the first user.

8. The system according to claim 7, wherein the audio-visual stream associated with the at least one resource is captured, in real-time, via a visual capture device associated with the at least one resource.

9. The system according to claim 1, wherein the at least one resource comprises a dwelling having the resource availability at the predetermined time period, wherein initiating provisioning of the at least one resource based on receiving a user confirmation further comprises:

transmitting a control signal to a resource provider node, the control signal being configured to reserve the dwelling for the predetermined time period, wherein the resource provider node is associated with the at least one resource.

10. The system according to claim 1, wherein identifying the historical resource parameters associated with the at least one resource further comprises:

identifying resource attributes associated with the at least one resource;

identifying user attributes associated with the first user; and based on at least the resource attributes and the user attributes, parsing historical data stored at a data storage device to produce the historical resource parameters, wherein the historical resource parameters comprise historical activity data associated with a plurality of individuals such that at least (i) the historical activity data matches the resource attributes and (ii) the plurality of individuals match the user attributes.

11. The system according to claim 1:

wherein the at least one resource associated with the resource availability at the predetermined time period is identified based on at least a user input received via the resource sharing management application;

wherein the user input, received via the resource sharing management application, comprises an indication for provisioning the at least one resource for a user group comprising the first user and the auxiliary user; and wherein determining the resource provisioning activity associated with the at least one resource further comprises:

parsing the historical resource parameters comprising historical activity data associated with a plurality of individuals to determine the resource provisioning activity, based on at least one of (i) determining that an individual group of the plurality of individuals associated with the resource provisioning activity corresponds to the user group, (ii) determining that a date associated with the resource provisioning activity corresponds to the predetermined time period, and (iii) determining that the resource provisioning activity corresponds to anticipated activities of the first user.

12. The system according to claim 1, wherein the historical resource parameters comprise historical activity data associated with a plurality of individuals, wherein identifying the added resource associated with the resource provisioning activity further comprises:

identifying a plurality of entities associated with performing the resource provisioning activity in the predetermined geographical area associated with the at least one resource;

determining a first entity of the plurality of entities based on at least one of (i) determining that a location of first entity in within a first predetermined distance from a geographical location of the at least one resource, (ii) determining that the location of first entity in within a second predetermined distance from a geographical location of an itinerary of the first user associated with the predetermined time period, and (iii) determining that the first entity matches an entity associated with the historical activity data associated with the plurality of individuals; and identifying, based on receiving a signal from an entity system associated with the first entity, added resource associated with the resource provisioning activity provided by the first entity that are associated with the predetermined geographical area and the predetermined time period.

13. The system according to claim 1, wherein initiating execution of the resource provisioning activity using the added resource further comprises:

receiving an activity trigger signal comprising an indication of initiation of the resource provisioning activity at a first entity by the first user; and transmitting, to an entity system associated with the first entity, a control signal structured to cause the first entity to supplement a resource transfer value associated with performing the resource provisioning activity at the first entity with the added resource.

14. The system according to claim 1, wherein executing the computer-readable code is configured to further cause the at least one processing device to:

transmit the resource sharing management application to the first user device associated with the first user, wherein the resource sharing management application is structured to:

access a credential instrument application stored on the first user device;

cause a presentation of a portion of a credential instrument application interface within the user interface of the resource sharing management application; and receive a selection of a user credential instrument from the first user, via the portion of the credential instrument application presented within the user interface of the resource sharing management application; and wherein initiating provisioning of the at least one resource further comprises initiating a resource transfer from the selected user credential instrument to a resource provider credential instrument associated with the at least one resource.

15. A computer program product for activity integration associated with a resource sharing management application, the computer program product being configured to provide a an enhanced resource sharing management platform with integrated resource activity features for performing resource activities in an integrated manner from a single interface and for establishing intelligent and responsive communication with a distributed network, the computer program product, comprising a non-transitory computer-readable storage medium having computer-executable instructions to:

initiate presentation of a user interface associated with a resource sharing management application on a first user device associated with a first user, wherein the resource sharing management application is configured to present the user interface on a display device of the first user device;

identify at least one resource associated with a resource availability at a predetermined time period;

identify an auxiliary user associated with the at least one resource;

identify an optimal first resource node of a plurality of resource nodes associated with the first user that is compatible for presenting a shared resource interface, comprising:

determining that a second resource node of the plurality of resource nodes is not compatible based on at least determining that (i) the second resource node does not comprise a predetermined compatible display device, and (ii) determining that the first user is not currently active on the second resource node; and determining that the first resource node is compatible based on at least (i) determining that the first resource node comprises a visual display device, (ii) determining that the first resource node is within a predetermined proximity of a location of the first user, and (iii) determining that the first user is currently active on the first resource node;

establish an operative communication channel between the first resource node associated with the first user and an auxiliary resource node associated with the auxiliary user;

initiate presentation of the shared resource interface across a distributed network of nodes such that a real-time view of the shared resource interface is presented on each node of the distributed network of nodes for a predetermined time interval, wherein the distributed network nodes comprises the first resource node and the auxiliary resource node, wherein the shared resource interface is structured to (i) allow a real-time virtual resource exploration of the at least one resource by each of the distributed network of nodes and (ii) provide real-time communication between each of the distributed network of nodes via the shared resource interface, wherein the real-time virtual resource exploration of the at least one resource by each of the distributed network of nodes further comprises:

presenting, a real-time virtual resource exploration component comprising an interactive audio-visual stream associated with the at least one resource on each of the distributed network of nodes;

identifying a predetermined gesture performed by the first user on the first resource node;

identifying a current view portion of the interactive audio-visual stream currently being displayed of the first user on the first resource node;

overlaying a graphical overlay element associated with the predetermined gesture on the interactive audio-visual stream;

continuously tracking the position of the graphical overlay element with respect to the interactive audio-visual stream;

modifying the graphical overlay element in response to a change in current view portion of the interactive audio-visual stream of the first user on the first resource node; and removing the graphical overlay element from the interactive audio-visual stream;

determine a resource provisioning activity associated with the at least one resource based on at least historical resource parameters associated with the at least one resource, wherein the resource provisioning activity is associated with a predetermined geographical area associated with the at least one resource;

identify an added resource associated with the resource provisioning activity, wherein the added resource is associated with the predetermined geographical area and the predetermined time period;

present, via the resource sharing management application, the resource provisioning activity and the identified added resource to the first user on the display device of the first user device;

initiate provisioning of the at least one resource based on receiving a first confirmation from the first user; and initiate execution of the determined resource provisioning activity using the added resource within the predetermined geographical area based on receiving a second confirmation from the first user.

16. The computer program product according to claim 15, wherein establishing an operative communication channel between the first resource node associated with the first user and the auxiliary resource node associated with the auxiliary user further comprises:

receiving, via the resource sharing management application, an indication from the first user to initiate the presentation of the shared resource interface across the distributed network of nodes.

17. The computer program product according to claim 15:
wherein the at least one resource associated with the resource availability at the predetermined time period is identified based on at least a user input received via the resource sharing management application;
wherein the user input, received via the resource sharing management application, comprises an indication for provisioning the at least one resource for a user group comprising the first user and the auxiliary user; and
wherein determining the resource provisioning activity associated with the at least one resource further comprises:
  parsing the historical resource parameters comprising historical activity data associated with a plurality of individuals to determine the resource provisioning activity, based on at least one of (i) determining that an individual group of the plurality of individuals associated with the resource provisioning activity corresponds to the user group, (ii) determining that a date associated with the resource provisioning activity corresponds to the predetermined time period, and (iii) determining that the resource provisioning activity corresponds to anticipated activities of the first user.

18. A method for activity integration associated with a resource sharing management application, the method being configured to facilitate an enhanced resource sharing management platform with integrated resource activity features for performing resource activities in an integrated manner from a single interface and for establishing intelligent and responsive communication with a distributed network, the method comprising:
  initiating presentation of a user interface associated with a resource sharing management application on a first user device associated with a first user, wherein the resource sharing management application is configured to present the user interface on a display device of the first user device;
  identifying at least one resource associated with a resource availability at a predetermined time period;
  identifying an auxiliary user associated with the at least one resource;
  identifying an optimal first resource node of a plurality of resource nodes associated with the first user that is compatible for presenting a shared resource interface, comprising:
    determining that a second resource node of the plurality of resource nodes is not compatible based on at least determining that (i) the second resource node does not comprise a predetermined compatible display device, and (ii) determining that the first user is not currently active on the second resource node; and
    determining that the first resource node is compatible based on at least (i) determining that the first resource node comprises a visual display device, (ii) determining that the first resource node is within a predetermined proximity of a location of the first user, and (iii) determining that the first user is currently active on the first resource node;
  establishing an operative communication channel between the first resource node associated with the first user and an auxiliary resource node associated with the auxiliary user;
  initiating presentation of the shared resource interface across a distributed network of nodes such that a real-time view of the shared resource interface is presented on each node of the distributed network of nodes for a predetermined time interval, wherein the distributed network nodes comprises the first resource node and the auxiliary resource node, wherein the shared resource interface is structured to (i) allow a real-time virtual resource exploration of the at least one resource by each of the distributed network of nodes and (ii) provide real-time communication between each of the distributed network of nodes via the shared resource interface, wherein the real-time virtual resource exploration of the at least one resource by each of the distributed network of nodes further comprises:
    presenting, a real-time virtual resource exploration component comprising an interactive audio-visual stream associated with the at least one resource on each of the distributed network of nodes;
    identifying a predetermined gesture performed by the first user on the first resource node;
    identifying a current view portion of the interactive audio-visual stream currently being displayed of the first user on the first resource node;
    overlaying a graphical overlay element associated with the predetermined gesture on the interactive audio-visual stream;
    continuously tracking the position of the graphical overlay element with respect to the interactive audio-visual stream;
    modifying the graphical overlay element in response to a change in current view portion of the interactive audio-visual stream of the first user on the first resource node; and
    removing the graphical overlay element from the interactive audio-visual stream;
  determining a resource provisioning activity associated with the at least one resource based on at least historical resource parameters associated with the at least one resource, wherein the resource provisioning activity is associated with a predetermined geographical area associated with the at least one resource;
  identifying an added resource associated with the resource provisioning activity, wherein the added resource is associated with the predetermined geographical area and the predetermined time period;
  presenting, via the resource sharing management application, the resource provisioning activity and the identified added resource to the first user on the display device of the first user device;
  initiating provisioning of the at least one resource based on receiving a first confirmation from the first user; and
  initiating execution of the determined resource provisioning activity using the added resource within the predetermined geographical area based on receiving a second confirmation from the first user.

19. The method according to claim 18, wherein establishing an operative communication channel between the first resource node associated with the first user and the auxiliary resource node associated with the auxiliary user further comprises:
  receiving, via the resource sharing management application, an indication from the first user to initiate the presentation of the shared resource interface across the distributed network of nodes.

20. The method according to claim 18, further comprising:

wherein the at least one resource associated with the resource availability at the predetermined time period is identified based on at least a user input received via the resource sharing management application;

wherein the user input, received via the resource sharing management application, comprises an indication for provisioning the at least one resource for a user group comprising the first user and the auxiliary user; and wherein determining the resource provisioning activity associated with the at least one resource further comprises:

parsing the historical resource parameters comprising historical activity data associated with a plurality of individuals to determine the resource provisioning activity, based on at least one of (i) determining that an individual group of the plurality of individuals associated with the resource provisioning activity corresponds to the user group, (ii) determining that a date associated with the resource provisioning activity corresponds to the predetermined time period, and (iii) determining that the resource provisioning activity corresponds to anticipated activities of the first user.

\* \* \* \* \*